US008156484B2

(12) United States Patent
Smith

(10) Patent No.: US 8,156,484 B2
(45) Date of Patent: Apr. 10, 2012

(54) LDAP SERVER PERFORMANCE OBJECT CREATION AND USE THEREOF

(75) Inventor: Richard J. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 11/842,982

(22) Filed: Aug. 22, 2007

(65) Prior Publication Data

US 2009/0055812 A1 Feb. 26, 2009

(51) Int. Cl.
*G06F 9/44* (2006.01)
*G06F 7/00* (2006.01)

(52) U.S. Cl. ........ 717/154; 171/151; 171/153; 171/156; 171/158; 707/716; 707/771

(58) Field of Classification Search ......................... None
See application file for complete search history.

(56) References Cited

U.S. PATENT DOCUMENTS

| | | | | |
|---|---|---|---|---|
| 5,355,492 | A * | 10/1994 | Frankel et al. | 717/151 |
| 5,926,639 | A * | 7/1999 | Richardson | 717/156 |
| 6,170,083 | B1 * | 1/2001 | Adl-Tabatabai | 717/158 |
| 6,366,954 | B1 * | 4/2002 | Traversat et al. | 709/220 |
| 6,539,382 | B1 | 3/2003 | Byrne | |
| 6,675,378 | B1 * | 1/2004 | Schmidt | 717/154 |
| 6,912,520 | B2 | 6/2005 | Hankin et al. | |
| 6,964,040 | B2 * | 11/2005 | Osborn | 717/151 |
| 6,970,873 | B2 | 11/2005 | Fu et al. | |
| 7,069,547 | B2 * | 6/2006 | Glaser | 717/154 |
| 7,107,595 | B2 | 9/2006 | Sanchez, II et al. | |
| 7,116,770 | B1 | 10/2006 | Tran et al. | |
| 7,346,840 | B1 * | 3/2008 | Ravishankar et al. | 715/234 |
| 7,543,283 | B2 * | 6/2009 | Luk et al. | 717/153 |
| 7,784,039 | B2 * | 8/2010 | Tanaka | 717/151 |
| 7,987,171 | B2 * | 7/2011 | Tesler et al. | 707/706 |
| 8,005,858 | B1 * | 8/2011 | Lynch et al. | 707/771 |
| 2001/0039549 | A1 | 11/2001 | Eng et al. | |
| 2002/0091819 | A1 | 7/2002 | Melchione et al. | |
| 2003/0028752 | A1 * | 2/2003 | Fu et al. | 712/200 |
| 2003/0115196 | A1 * | 6/2003 | Boreham et al. | 707/4 |
| 2003/0163439 | A1 * | 8/2003 | Hankin et al. | 707/1 |
| 2004/0073899 | A1 * | 4/2004 | Luk et al. | 717/158 |
| 2005/0097317 | A1 | 5/2005 | Trostle et al. | |
| 2005/0102297 | A1 | 5/2005 | Lloyd | |

(Continued)

OTHER PUBLICATIONS

"Scalable Directory Services Using Proactivity", Fabian E. Bustamante et al., 2002, pp. 1-12, <http://delivery.acm.org/10.1145/770000/762786/p25-bustamante.pdf>.*

(Continued)

*Primary Examiner* — Thuy Dao
*Assistant Examiner* — Ziaul A Chowdhury
(74) *Attorney, Agent, or Firm* — Robert H. Frantz; Jeffrey S. LaBaw

(57) ABSTRACT

A system in which a plurality of performance objects are stored in computer memory, where each performance objects contains at least one input template and a corresponding optimized code path program product. A template matcher intercepts an input set destined to a directory server, and then determines a match between the intercepted input set and one of the templates. A code path selector then retrieves the corresponding optimized code path program product stored in a performance object associated with the matched template. Finally, a code processor executes the retrieved optimized code path program product on the intercepted input set, and stores the result in a tangible computer media through alteration of a physical property of the media.

19 Claims, 23 Drawing Sheets

U.S. PATENT DOCUMENTS

| | | | | |
|---|---|---|---|---|
| 2005/0216485 | A1* | 9/2005 | Bell et al. | 707/100 |
| 2006/0015527 | A1 | 1/2006 | Dingle | |
| 2006/0168255 | A1 | 7/2006 | Katz et al. | |
| 2006/0253506 | A1 | 11/2006 | Jog et al. | |
| 2007/0226721 | A1* | 9/2007 | Laight et al. | 717/154 |
| 2008/0133480 | A1* | 6/2008 | Rowley | 707/3 |
| 2009/0037446 | A1* | 2/2009 | Tonev et al. | 707/101 |

OTHER PUBLICATIONS

John Kubiatowicz et al.,"OceanStore: An Architecture for Global-Scale Persistent Storage", [Online], 2000, pp. 190-201, [Retrived on Nov. 23, 2011, Retrieved from Internet], <http://delivery.acm.org/10.1145/380000/379239/p190-kubiatowicz.pdf>.*

Justin Zobel,"Inverted Files for Text Search Engines", [Online], Jul. 2006, pp. 1-56, [Retieved online on Nov. 23, 2011], [Retrieved from Internet], <http://delivery.acm.org/10.1145/1140000/1132959/p1-zobel.pdf>.*

Heinz Johner et al.,"LDAP Implemention Cookbook", Jun. 1999, [Online], pp. 1-310, [Retieved online on Nov. 23, 2011], [Retrieved from Internet],<http://herrold.us/Idap/sg245110.pdf>.*

Hars Volos et al.,"Mnemosyne: Lightweight Persistent Memory", [Online], 2011, pp. 1-13, [Retrieved on Nov. 23, 2011], [Retrieved from Internet], <http://pages.cs.wisc.edu/~swift/papers/asplos11_mnemosyne.pdf>.*

* cited by examiner

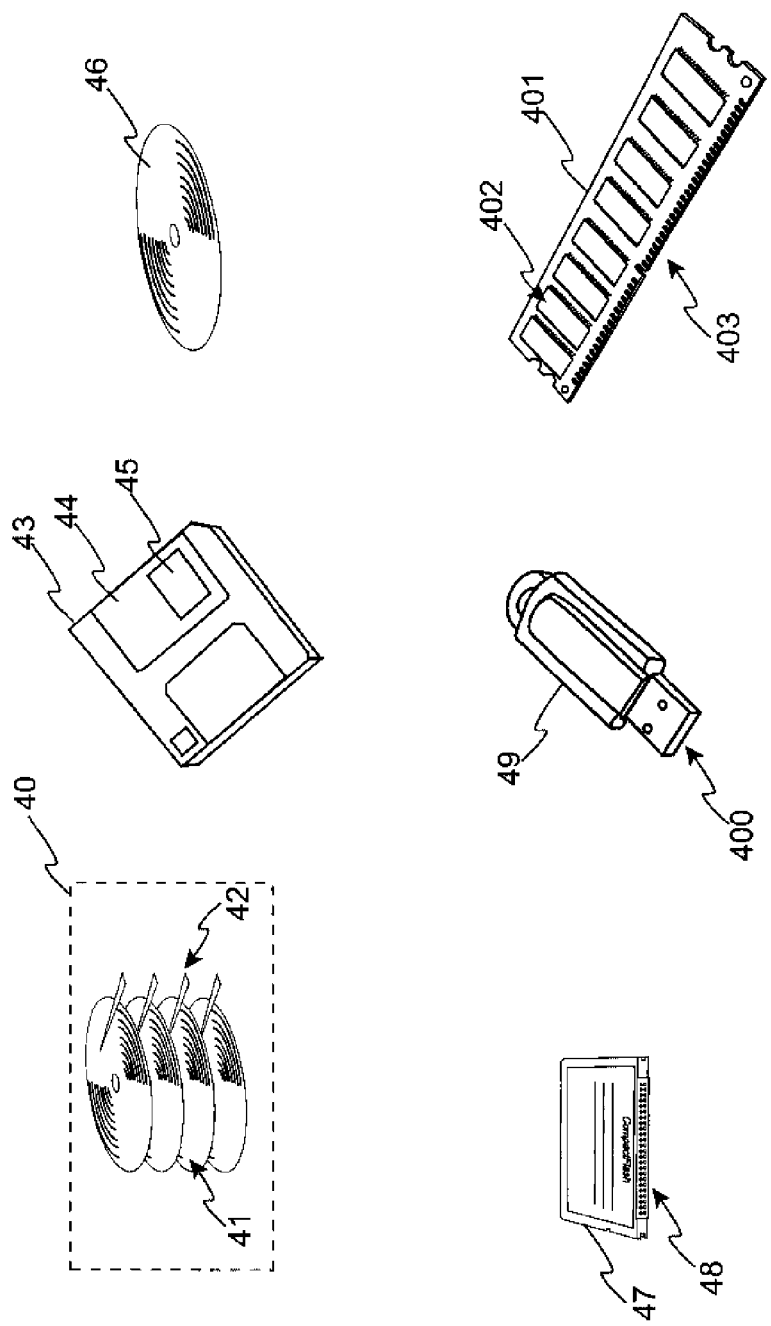

LDAP SERVER PERFORMANCE OBJECT CREATION AND USE THEREOF

BACKGROUND OF THE INVENTION

1. Field of the Invention

The present invention relates generally to systems and methods for optimizing the performance of remotely accessible computer directories, and especially to Lightweight Directory Access Protocol directories.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "prior Art" is specifically stated. Otherwise, all statements provided within this Background section are "other information" related to or useful for understanding the invention.

Computer directories are essentially specialized databases of information in which the contained information is organized in a specific manner, such as a hierarchical manner. A computer directory can be accessed locally by the computer on which the directory is stored, or remotely over a computer network by another computer, program, method, or process.

Protocols and techniques for providing such remote directory access are well-known, some of which are open standards, and some of which are proprietary in nature. For example, the Lightweight Directory Access Protocol ("LDAP") is a well-known open standard based upon, but simpler than, the X.500 protocol, which is also an open standard protocol Other protocols which offer similar functionality are Microsoft's Active Directory, and Novell Directory Service ("NDS").

For the purposes of the present disclosure, an "approach" will refer to a tactical series of operations, decisions, and queries which are performed responsive to a certain "stimulus", where "stimulus" is used to describe in a generic sense a set of inputs, commands, queries, or a combination of inputs, commands and queries. For example, query is developed to create a mailing list of all customers of a company who have purchased wool socks in the last year and who have looked at, but not purchased, hiking boots. The information needed may exist in several databases. So, an approach is developed, such as first accessing a database of sales orders, and extracting all sales orders which include socks. Then, using these sales order numbers, accessing a second database of customer names and addresses to extract all names and addresses to which the orders were shipped. Finally, these extracted names and addresses can be used to key into another database of web store records to find which of these customers added shoes to their shopping carts but did not make a purchase. This final set of reduced names and addresses would be the "result" or product of the "approach".

As such, an approach usually includes access to multiple databases, and many conditional statements. More generalized approaches for interfacing to sets of databases are designed in order to handle a wide array of inputs, commands, and queries, such that one generalized program or method handles any of the range of input commands and queries by using conditional statements, accessing and evaluating contents of data stores, caches, etc., and proceeding until a result is produced.

However, these large, generalized approaches are often not efficient for most inputs, commands and queries, whereas their structures trade off efficiency for generality. Each of the conditional operations, and each of the conditional accesses to caches, for example, have a cost associated with them, such as processing time, consumption of processing resources, etc. If the conditional operation or access to a cache is not successful for a specific input scenario, then the potential benefit to the operation or access is not realized, but the cost of the operation is still incurred.

Some directory service programs attempt to improve on efficiency and performance by optimizing for "average" input scenarios. In such a strategy, the software or an administrator modifies the approach to maintain generality, but to streamline code path flow for what is believed to be the average input scenarios. This, however, often leaves many conditional operations in the code path. Further, through the averaging process (e.g. instrumentation, counting, measuring, etc.), strange and difficult to handle input scenarios may be included in the averaging results, thereby causing the generalized approach to be less optimal than possible.

Other directory service programs attempt to improve on efficiency by adding local storages of data, such as in caches, which is needed often. This actually increases resource consumption, and only improves performance for input scenarios which have successful cache "hits", while decreasing performance for all other input scenarios where there is a cache "miss".

Still other attempts to improve efficiency have included variations and combinations of these two approaches, such as caching data which is indicated as highly used by an average input scenario.

SUMMARY OF THE INVENTION

The invention provides a system in which a plurality of performance objects are stored in computer memory, where each performance objects contains at least one input template and a corresponding optimized code path program product. A template matcher intercepts an input set destined to a directory server, and then determines a match between the intercepted input set and one of the templates. A code path selector then retrieves the corresponding optimized code path program product stored in a performance object associated with the matched template. Finally, a code processor executes the retrieved optimized code path program product on the intercepted input set, and stores the result in a tangible computer media through alteration of a physical property of the media.

BRIEF DESCRIPTION OF THE DRAWINGS

The following detailed description when taken in conjunction with the figures presented herein provide a complete disclosure of the invention.

FIGS. 4a, 4b and 4c, illustrate computer readable media of various removable and fixed types, signal transceivers, and parallel-to-serial-to-parallel signal circuits.

DETAILED DESCRIPTION OF THE INVENTION

Figure 1:
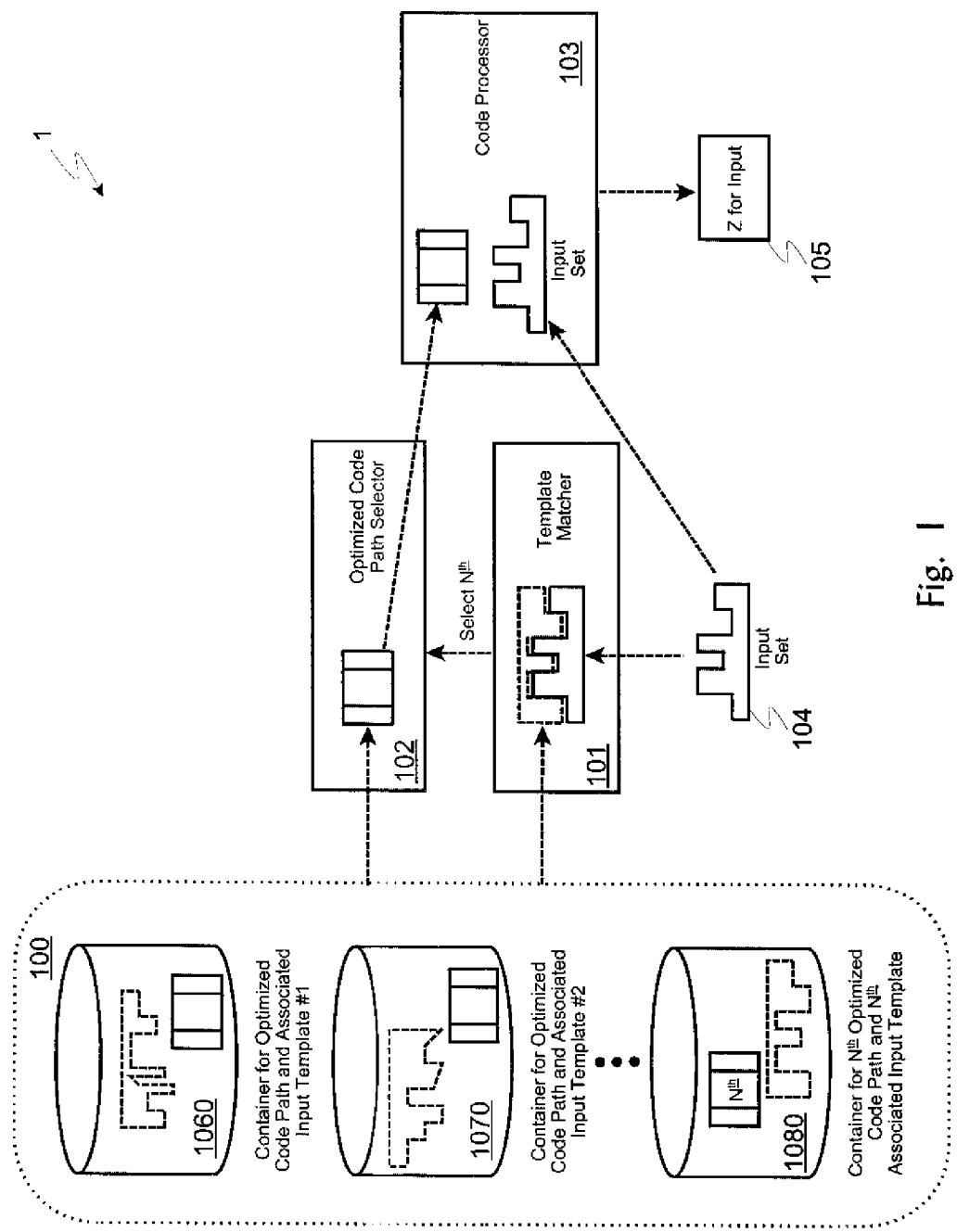
FIG. 1 sets forth a system according to the present invention.

Recognition by Inventors of Unaddressed Problem in the Art

Current LDAP implementations use a generalized set of rules to access data. The first level is within the LDAP server—it generates the Structured Query Language ("SQL") as is suggested by average client needs and uses these default rules all the time.

The second level is database ("DB") tuning for the general case. Both of these are static and not optimized for all customer uses of the LDAP server. This is mostly a convenience for the average user, and sometimes a protection for the cases that some optimizations can improve performance in one area while damaging another.

Conceptual Overview of the Invention

While the present invention will be described with respect to an implementation for LDAP directory servers and efficiency improvements thereof, it will be recognized by those skilled in the art that even though the recognition of the LDAP-related problems as described in the foregoing paragraph led to the development of the invention as a solution, the invention is not limited to application or implementation to LDAP processes and servers, but may be applied to a wide array of directory services processes, products, and servers, and may also be applied to many other non-directory processes.

The present invention creates, provides, and uses an object stored in the directory (LDAP server) that holds performance data for the uses of the particular customer. The server then uses these rules stored in the performance object for all following directory accesses. If the directory was used by several different 'customers', each is provided a performance object for their suffix (e.g. section of the database).

This performance object is populated by running typical uses of the directory with performance probes on, sampling possible optimum solutions, and storing these best performance access methods. For example, a search is probed to find the best ordering of clauses in the LDAP generated SQL statements sent to DB2. If needed, several searches and permutations of SQL are tried and evaluated for a best fit. A best fit is saved in the performance object. DB2 is commanded to generate performance data in tested scenarios, and the best DB2 tuning also stored in the performance object, too. The parameters stored in the performance object are used over default values. If the client usage of the directory changes, the performance object are updated as required.

Using this high-level method, then, the invention produces optimized code paths, extracted from the generalized process, and associates them with input recognition templates. These optimized code paths avoid use of conditional operations and conditional accesses (e.g. cache hits and misses) for input sets which have historically shown to always branch through the conditionals in the same way (e.g. a certain check is always true, a certain search of a cache is usually unsuccessful, etc.).

This avoids employing a rolling set of requests which can be skewed by an errant or odd data point by avoiding use of averaging and prediction. The invention also eliminates many of the back-and-forth queries for each input and each conditional decision Details of a System According to the Invention The present invention is preferably realized as a programmed machine, such as a computer platform executing certain logical processes. As will be recognized by those skilled in the art, all or some of the functionality of a system according to the invention may be committed to circuitry, machinery, and other types of non-software realizations.

Figure 5:
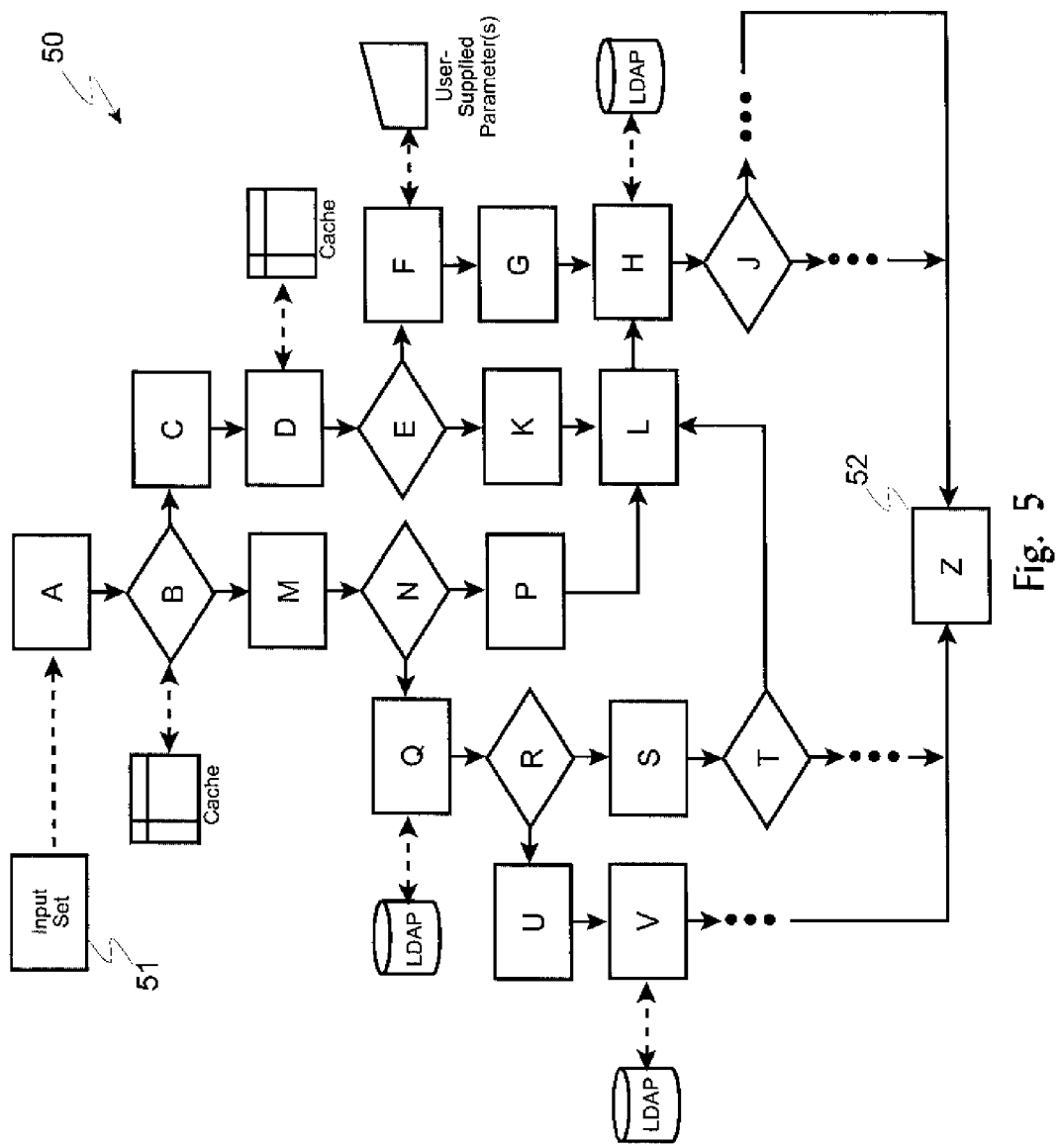
FIG. 5 provides an example of a complex, multi-code-path generalized process which is designed to handle a wide range of input scenarios using many conditional operations and accesses.

For reference in illustrative examples, FIG. 5 shows a hypothetical generalized process (50), which receives an input set (51) and produces a result (52). Some steps are conditional (B, E, J, R, T), and some are always executed (A, D, F, G, H, K, L, M, P, Q, S, U, V) if processing leads to them. Some of the conditional steps query or check other sources of data, such as steps checking contents of cache memory (B) or a contents of a directory (H, Q, V), and some non-conditional steps require user-supplied parameters (F) or access cache (D). As such, depending on the input received, results of conditional and results of intermediate non-conditional steps, a result is produced, even if that result indicates a incomplete answer or error condition. The process shown in this figure is meant simply as an illustration for use in the following examples, and it will be understood by those skilled in the art that the present invention may be applied to many different generalized processes.

For comparative purposes, we will refer to this complex process as "generalized" because it has been provided with many conditional steps and checks in order to allow it to handle many different input sets (e.g. inputs, commands, queries, etc.) Depending on the content of the input sets, certain conditional statements will be true or false, and multibranch conditional operations (e.g. CASE, SWITCH, etc.) statements will direct processing down varying paths or branches of the logical flow. As each different input set is processed, then, a particular code path is established.

Figure 6:
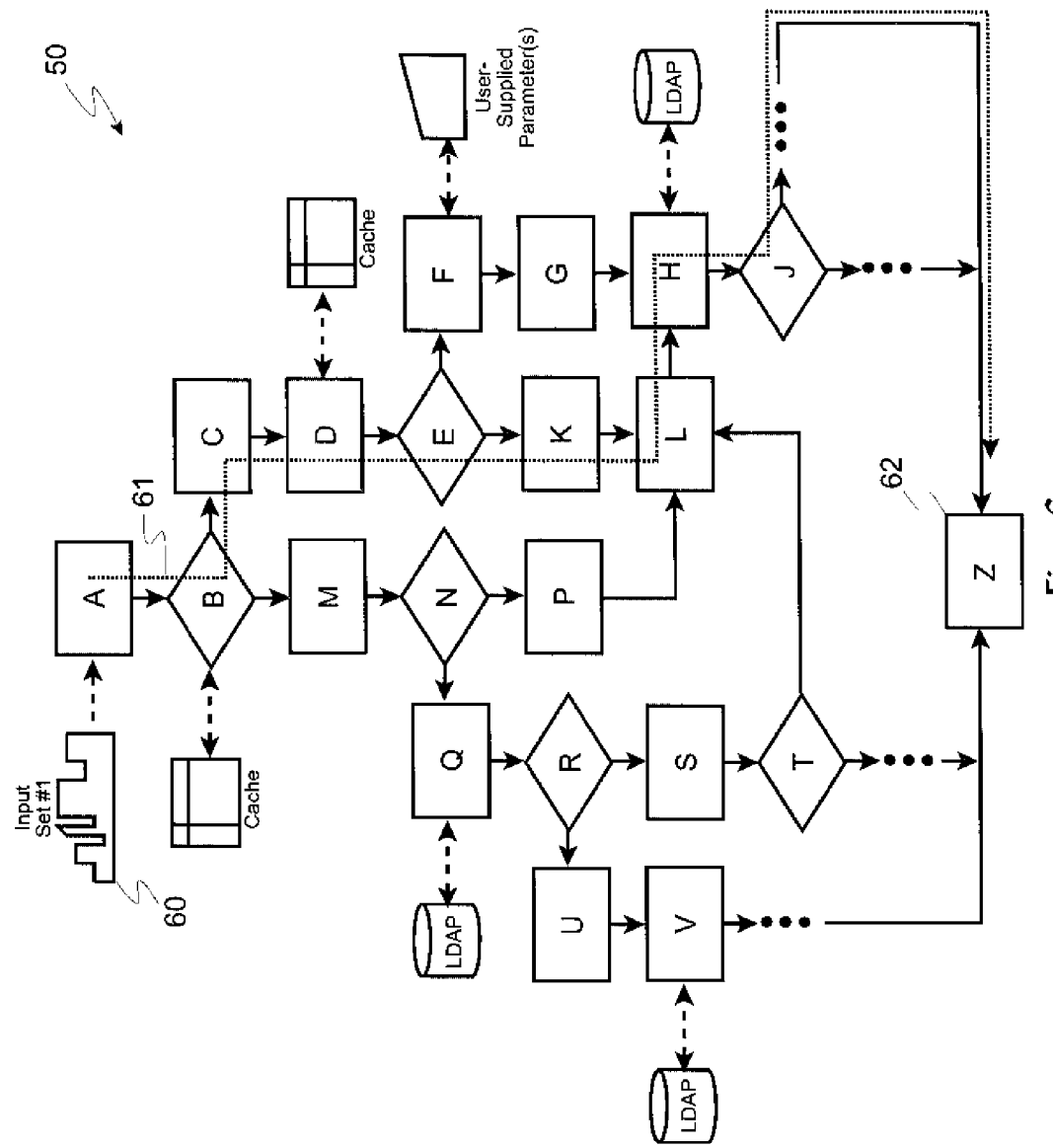
FIG. 6 illustrates an example code path for a first input set through the example process of FIG. 5.

For example, consider FIG. 6, in which a first code set (60) is received by step A of the generalized process (50). In Step B, a cache is checked, and conditional to the results of the cache check, Steps C and D are executed. Then, conditional to the results of Step E, Steps K, L, and H are executed. Processing continues until a result is produced (Z). Such a code path, including conditional steps, could be described as A-B-C-D-E-K-L-H-J . . . -Z. The foregoing example of an LDAP approach to generate a mailing list of customers who bought socks within the last year, and looked at but did not purchase hiking boots, could fit such a code path.

Figure 7:
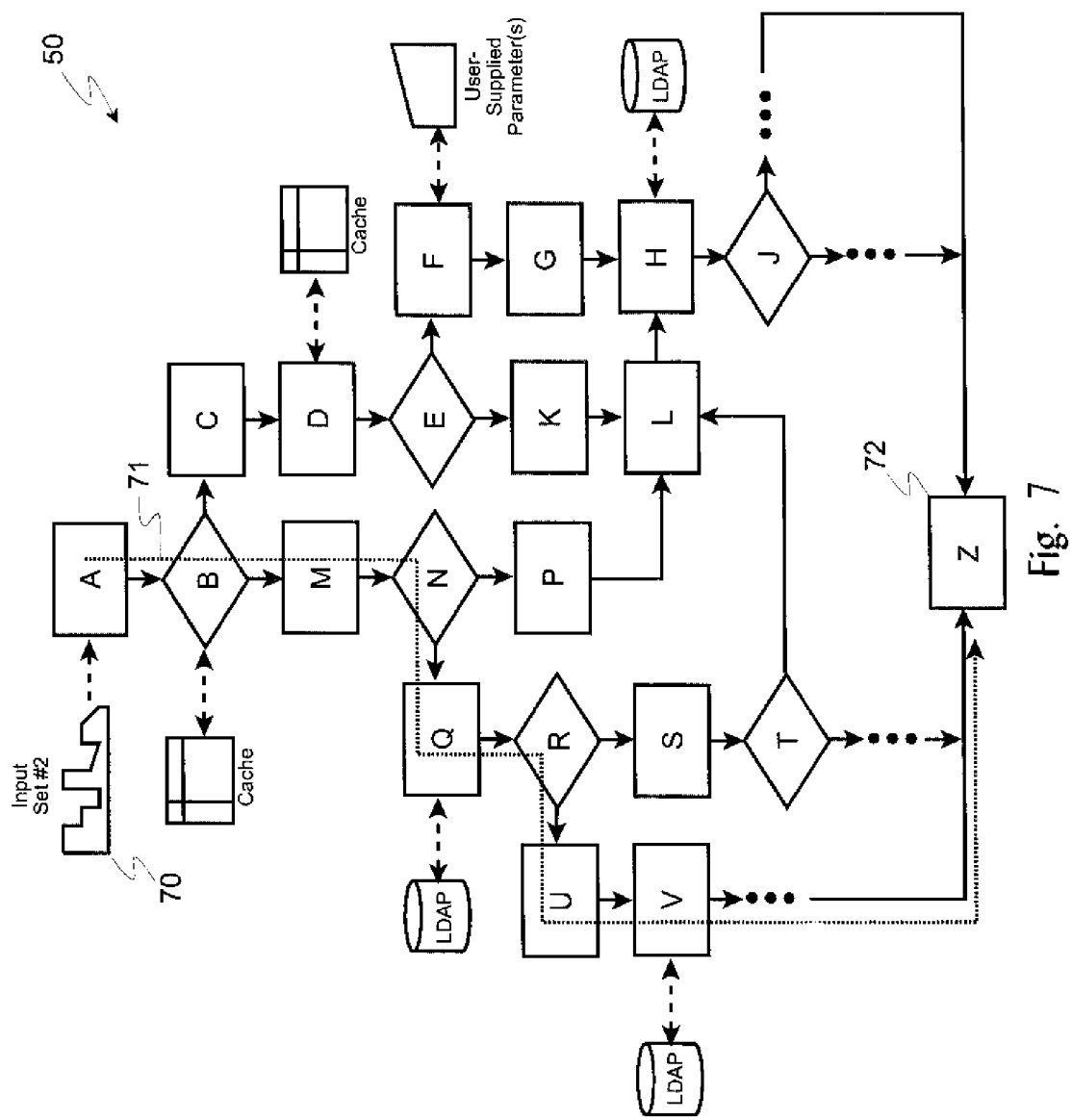
FIG. 7 illustrates an example code path for a second input set through the example process of FIG. 5.

But, for a second input set (70) received by the generalized process (50), the code path may be significantly different, as shown in FIG. 7. This second input set, for example, may be inputs, commands and queries to create a billing report of all customers who have not paid their balances due on their retail credit agreements. This hypothetical input scenario is much different that the first input set, and results in a different code path A-B-M-N-Q-R-U-V- . . . -Z, as shown.

Figure 8:
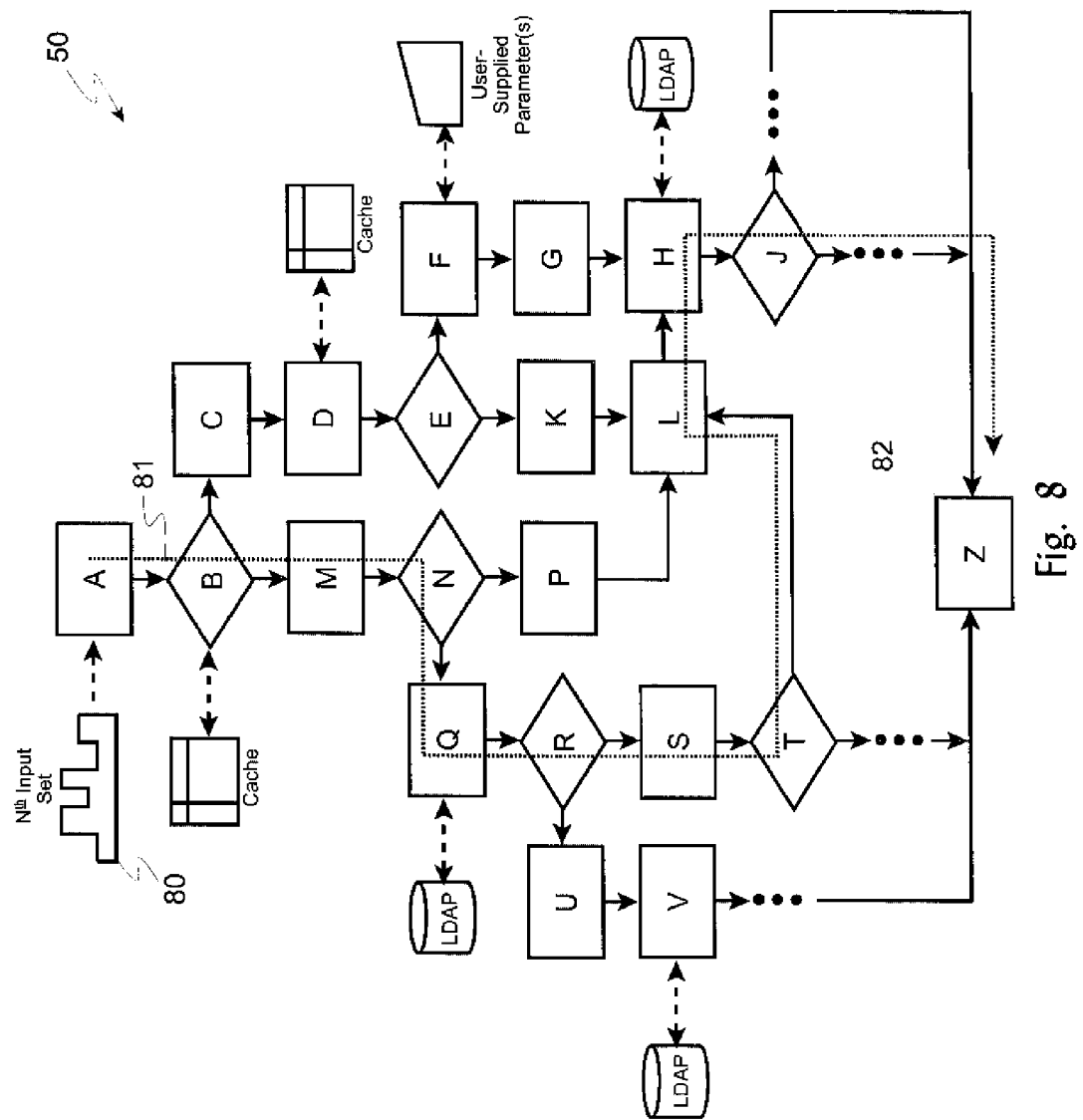
FIG. 8 illustrates an example code path for an $N^{th}$ input set through the example process of FIG. 5.

Finally, for an $N^{th}$ input set (80) received by the generalized process (50), the code path may be again significantly different, as shown in FIG. 8. This $N^{th}$ input set, for example, may be inputs, commands and queries to create a report of all customers who received a certain value of purchases that were shipped via a particular shipment contractor, such as an overnight courier. This hypothetical input scenario is much different that the first input set, and results in a different code path A-B-M-N-Q-R-S-T-L-H-J- . . . -Z, as shown.

Such code paths through generalize processes are highly typical of those found in LDAP and other types of directory servers. For radically different input sets, radically different code paths are taken. The process is considered generalized because it incorporates conditional operations which allow it to handle the wide range of input sets.

However, the inventor has realized that previously-applied optimization techniques, such as adding caches at strategic locations in the generalized process, do not achieve the optimal path from start to finish for any particular input set, but may achieve optimal operation when averaged over a wide array of input sets.

Using instrumentation and processing probes, such as DB2 probes, the "cost" and "benefit" of each operation, and especially each conditional operation, can be determined. Then, collected information about the input types, and grouping them according to similarities, can be used to divide the broader group of all input sets into categories of similar input sets.

For example, most operations to build a mailing list based on previous consumer purchases qualified by a non-purchase condition might take the code path of an input set as shown in FIG. 6. And, if an analysis of the performance data from the probes reveals that the cache check of Step B rarely results in a hit, it can be determined that it is most efficient for input sets of type #1 to skip or omit execution of Step B all together. This eliminates resource usage regarding the cache, and reduces processor cycles to make the check. Similarly, if conditional step J always results in the same branch, it can be eliminated for input sets of type #1.

Further, based on the performance data, analysis can reveal that many steps in the generalized process are never or very rarely executed for a certain input set type, such as steps M, N, P, F, G, Q, R, U, V, S, and T, for input sets of type #1.

Input Set Templates and Recognizer

Figure 9:
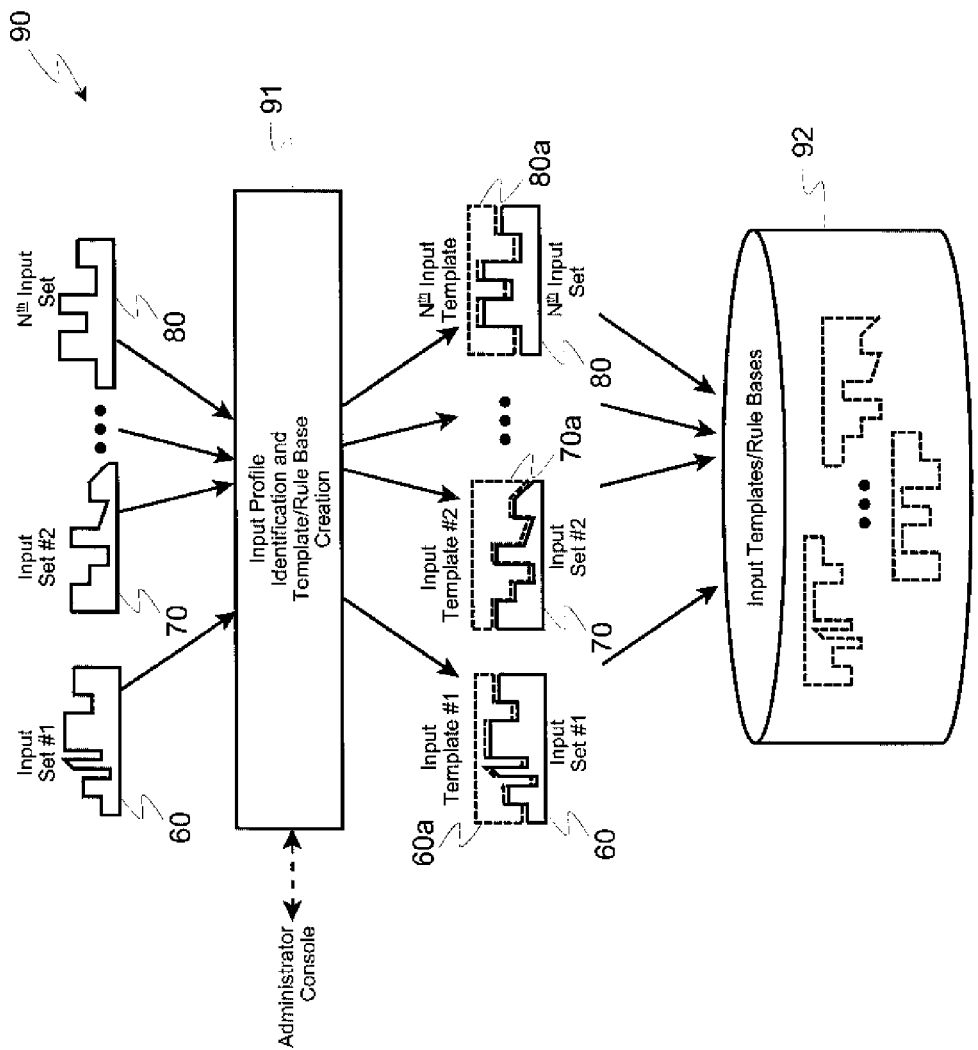
FIG. 9 shows a system for generating a set of input templates or rule bases according to the invention.

Turning to FIG. 9, a system is shown according to one aspect of the present invention which recognizes and categorizes input sets, the use of which will be explained in the following paragraphs.

In this figure, each input set type is illustrated using a skyline-like icon, or a key-tooth icon, in order to show its uniqueness. Multiple real input sets (60, 70, 80) are received by the system (91) which compares them, optionally with input from an administrator, for similarities and dissimilarities. Those which are determined to have a high degree of similarity, such as requesting similar output information but differing only by input argument names or handles, are grouped into an input set type. In one manner of practicing the present invention, this step of comparison and analysis to determine whether or not the query structure of several input sets are similar except for difference in variable values can be done manually. Then, in this manner of practice, a template is generated to match or "detect" the known common structure of the input sets.

Using our previous example of a query for customers who bought socks within the last year, and looked at but did not purchase boots, a specific hypothetical query for this information may appear as:

```
RETRIEVE-CUSTOMER-DATA(customer_name, customer_address):
TRUE(
    purchase_type INCLUDES "socks" AND
    purchase_date > (today-365) AND
    pages_browsed CONTAINS "boots" AND
    purchase_type DOES NOT INCLUDE "boots")
```

In this hypothetical query language, the structure of the query comprises the portions which are not variable. Another query having the same structure, but seeking different information might be:

```
RETRIEVE-CUSTOMER-DATA(customer_name, customer_address):
TRUE(
    purchase_type="air_fare" AND
    purchase_date > (today-7) AND
    pages_browsed CONTAINS "hotel" AND
    purchase_type DOES NOT INCLUDE "hotel")
```

These two inputs, and many others having the same structure, can be generalized to represent structure only as follows:

```
RETRIEVE-CUSTOMER-DATA(return_1:return_N)
TRUE(
    purchase_type="param_1" AND
    purchase_date > (param_2) AND
    pages_browsed CONTAINS "param_3" AND
    purchase_type DOES NOT INCLUDE "param_3")
```

A corresponding template, expressed in a hypothetical syntax or pseudo-code language, could then be written to recognize or detect such a structure:

```
IF query INCLUDES
    (purchase_type AND purchase_date) AND
    (pages_browsed <variable_1> AND
    purchase_type <> <variable_1>
```

-continued

```
THEN
    INVOKE optimized_code_path_A(param_1, param_2, param_3)
ENDIF
```

It is within the skill of these in the art to adapt query scenarios such as these to specific query languages, such as SQL, and to specific template logic, such as a Java applet or C++ function.

Further, it is within the skill in the art to develop an automated process to perform the comparison of multiple input queries, such as hundreds or thousands of queries, which detects similarities and differences between queries to extract structures, which can then be matched to templates. For example, table-driven comparisons can be enabled by first performing query restructuring in order to arrange elements of the query into a standard order or format. Then, the restructured query can be processed through one or more tables to qualify and recognize it as belonging to one or more known structures.

As such, a recognition template (or rule base) which matches or identifies each input type set is created or otherwise provided (60a, 70a, 80a). For illustrative purposes, in FIG. 9 a matching but complementary skyline icon is shown, but in practice, such a template or rule base is likely a lookup table or set of logical statements as previously described.

These templates are then stored (92) for use by the rest of the invention as described in the following paragraphs.

It is useful to note that, according to one advantage of the present invention, there is no requirement for the templates to be organized, identified, or otherwise correlated to a particular customer, user, client or requester. A customer, client device, client process, or requesting device or process may be indicated in the search query structure, and thus some inherent correlation to the customer may be created. However, the templates generally are re-usable by all customers, clients, and requesters who submit queries having the same or similar structure that a template matches.

Optimized Code Path Generator

Figure 10:
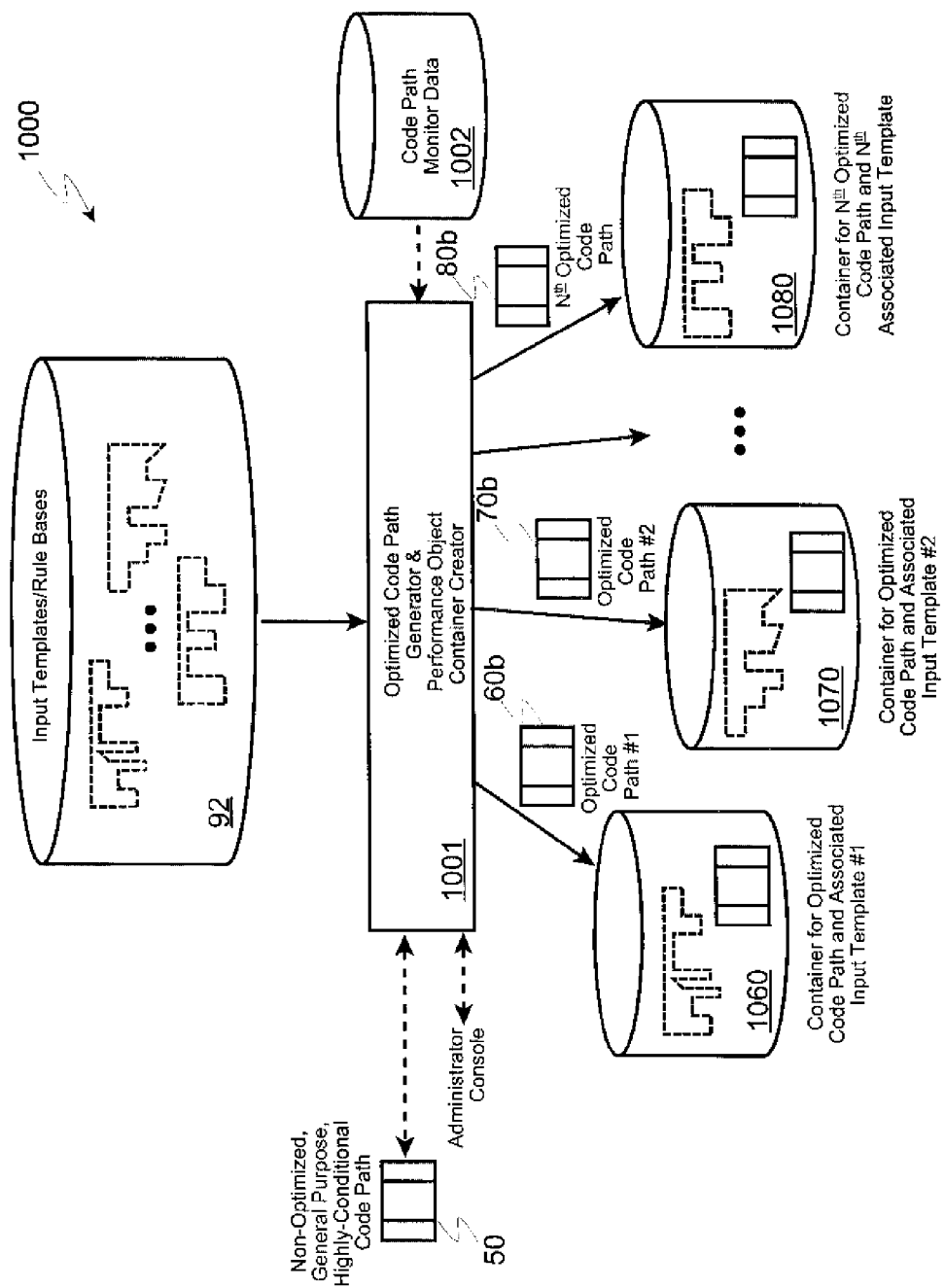
FIG. 10 sets forth a system for generating optimized code paths from a generalized process using code path monitor data and input templates according to the invention.

As shown in FIG. 10, the input templates (92) are used by another system component according to the invention, the optimized code path generator (1001). This portion of the invention also reads or accesses the generalized, highly-conditional process (50), and accesses the code path monitor data (1002) collected from actual processing of each input set.

Then, by correlating the actual code paths executed by actual input sets assigned to each input set type (e.g. by template), it is determined which code paths are executed by which input set types matching each template. Such optimized code paths, for example, would be A-B-C-D-E-K-L-H-J- . . . -Z for input set #1 in the previous example. But, further analysis of multiple traverses of this code path may reveal that conditional steps B, E, and J can be eliminated or "hard-coded" (e.g. the operation can be converted to unconditional), as discussed in more detail in the following paragraphs. Such analysis can be made by examining actual traverses as reported by code monitoring probes, where real input queries matching the specific query structure are used as the stimulus to the generalized code path. Alternatively, the logic of the generalized code path can be evaluated against the generalized query structure for a specific input set type (e.g. a specific query structure) to determine which steps and code branches are not used or unlikely to be traversed.

Finally, the optimized code path generator (1001) stores each associated input template with the corresponding optimized code path in a container (1060, 1070, 1080) as an directory performance object.

Figure 17:
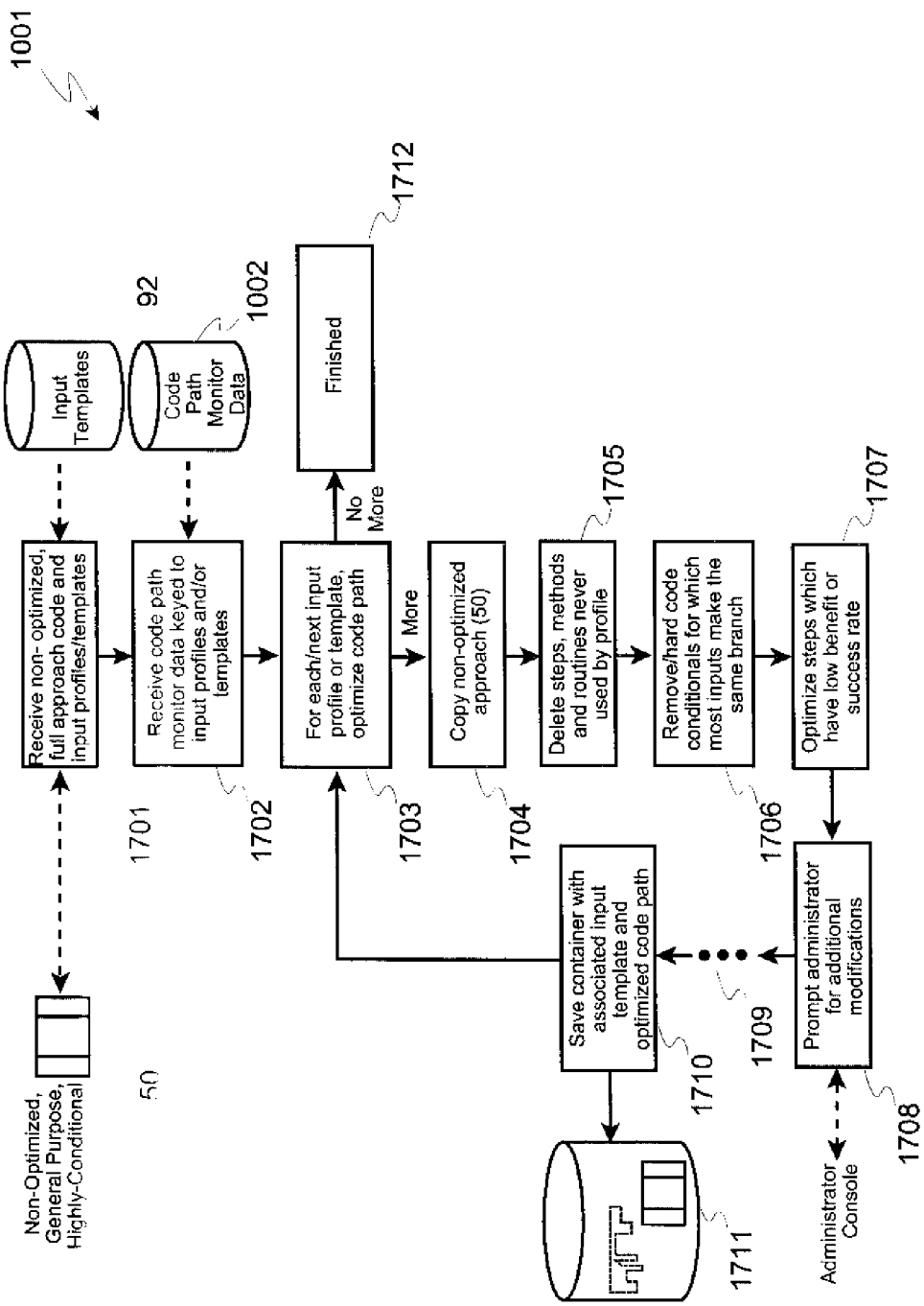
FIG. 17 provides an illustration of one embodiment of a logical process, machine, or system to generate containers of associated input templates and optimized code paths.

FIG. 17 outlines a logical process or programmed machine (1001) which creates an optimized code path, where the unused steps and operations are either removed from the final path, or are modified to minimize their execution cost.

First, the non-optimized generalized process (50) is received (1701) along with the previously-identified input templates (92). The code path monitor data is also accessed (1002). Then, for each existing input profile or template (1703), the full non-optimized approach (50) is copied, and then any unused steps, methods, operations and routines are removed (1705) from the copy.

Next, statistics for the results of the conditional steps are analyzed, and any conditional steps which always cause the same choice/branch, or which perform an operation which rarely results in a benefit (e.g. checking cache), are modified to eliminate the conditional operation (e.g. processing directly to the next usually executed step), or modified to minimize cost of the operation. This reduced process made from a copy of the generalized process is then saved as the optimized code path for that particular input set type (e.g. for inputs which match that template).

Figure 13:
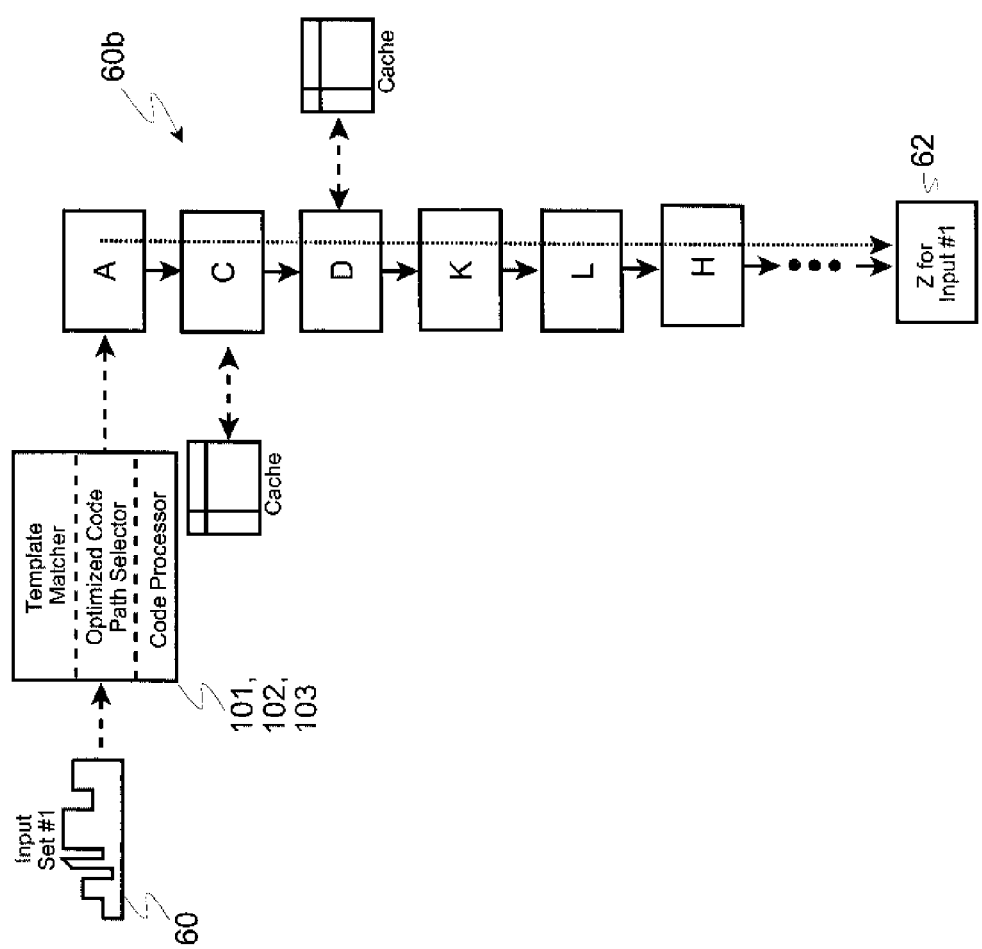
FIG. 13 illustrates an optimized code path or process for the first example input set to yield the same results as the example generalized process of FIG. 5.

Consider, for example, the optimized code path (60b) for input set #1 as shown in FIG. 13. This code path has no conditional operations at all, only includes operations to access cache that normally result in a hit. Thus, the code path A-C-D-K-L-H- . . . -Z is optimal for any input sets of type #1.

Figure 14:
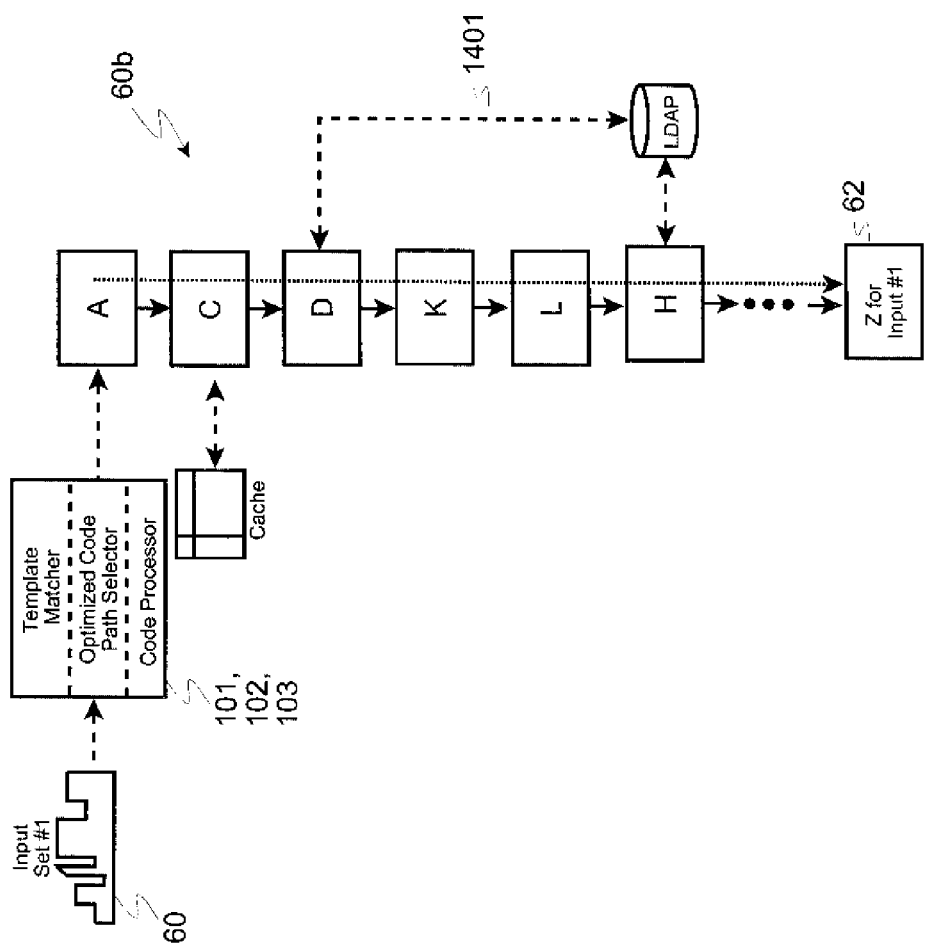
FIG. 14 illustrates an alternate optimized code path or process for the first example input set to yield the same results as the example generalized process of FIG. 5.

However, if hits to cache in Step D are rarely successful, and if most often Step D results in an access to an LDAP directory, the most efficient path may be to forgo attempting a cache access for input sets of type #1, as shown in FIG. 14.

Figure 15:
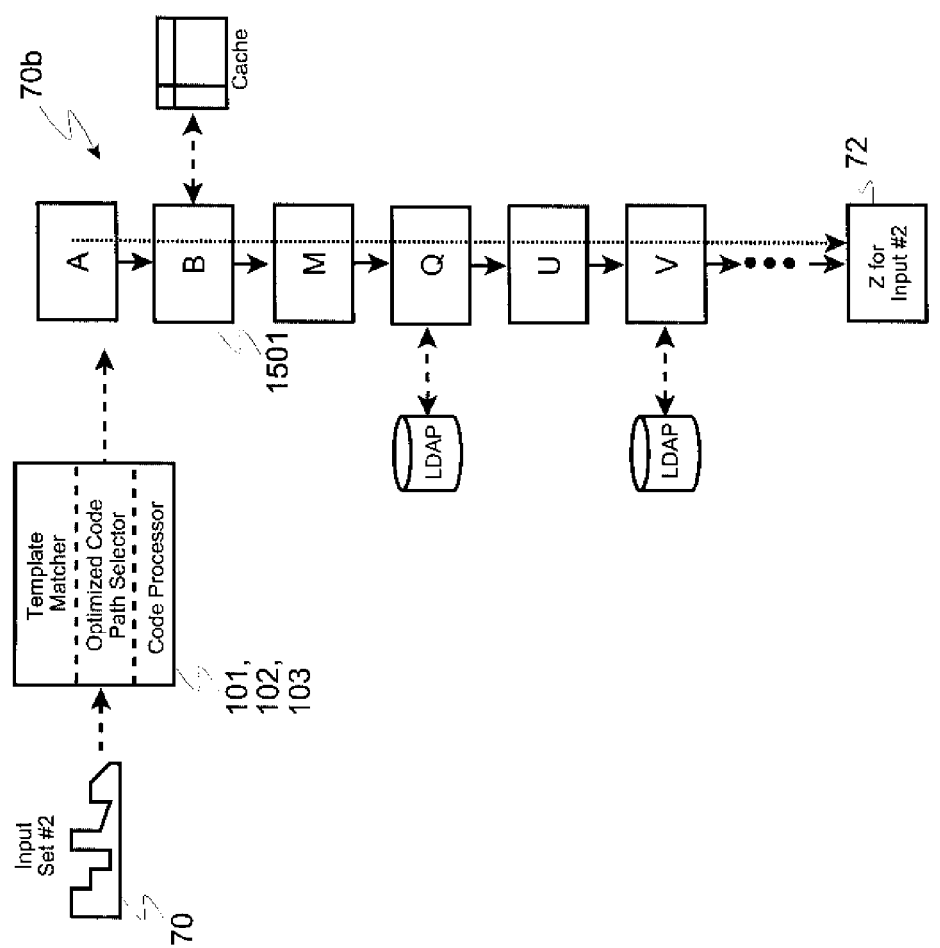
FIG. 15 illustrates an optimized code path or process for the second example input set to yield the same results as the example generalized process of FIG. 5.

Similarly, FIG. 15 shows an optimized code path (70b) for input sets of type #2, which consists of steps A-B-M-Q-U-V- . . . -Z. Note particularly in this example that conditional set B from the generalized process has been modified to be a non-conditional operation (1501) that always accesses cache. This may, for example, be done when code performance data indicates that accesses to cache are highly successful.

Figure 16:
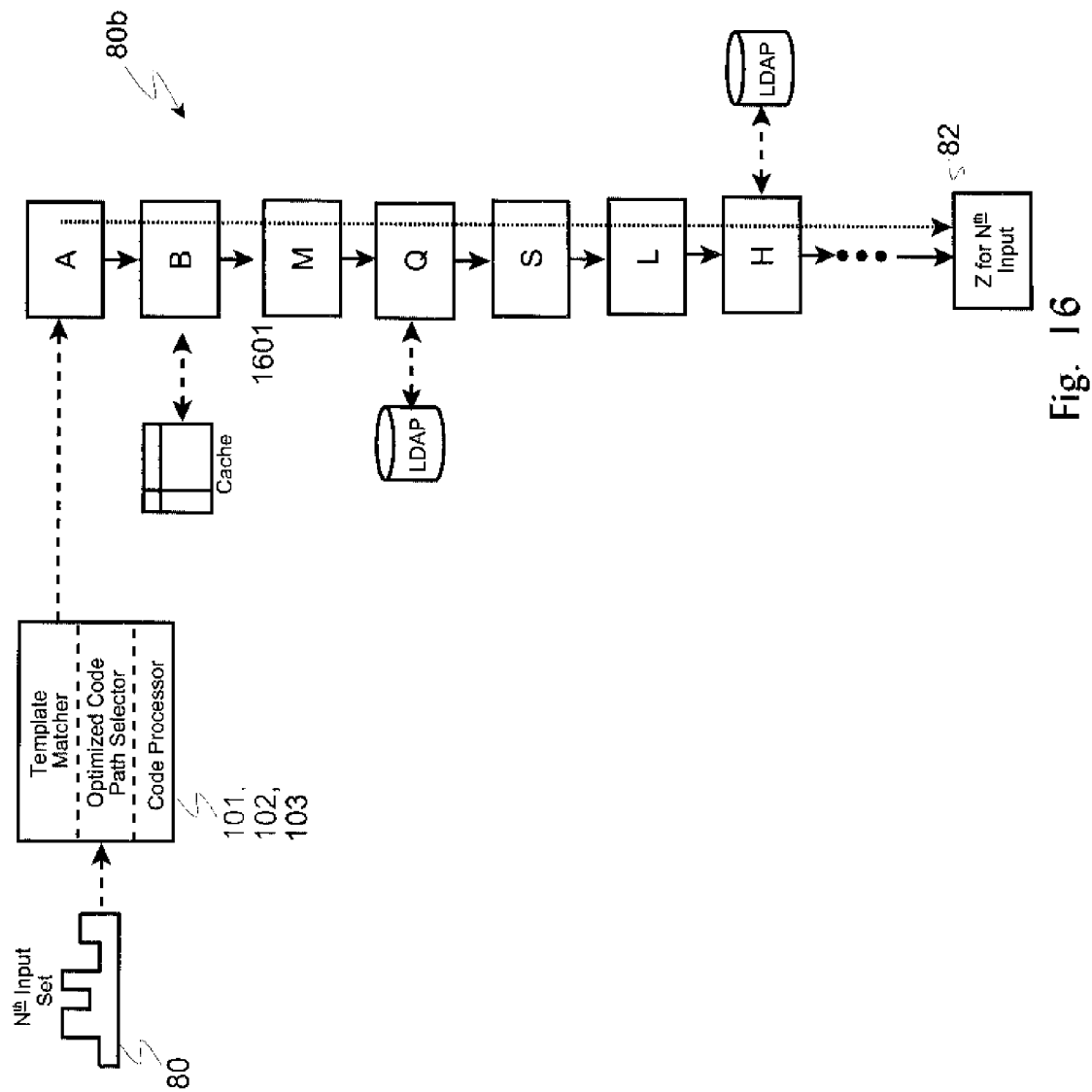
FIG. 16 illustrates an optimized code path or process for the $N^{th}$ example input set to yield the same results as the example generalized process of FIG. 5.

And, likewise in FIG. 16, an optimized code path (80b) A-B-M-Q-S-L-H- . . . -Z for the $N^{th}$ input set type is produced, including a non-conditional version of Step B (1601).

Each of these optimized code paths will generate exactly the same results (62, 72, 82) for their respective input set types (60, 70, 80) as the generalized process (50) will or would have, albeit much more efficiently and effectively.

Recognition of Input, and Selection and Execution of Optimized Code Path

Turning now to FIG. 1, another system component according to the present invention is shown, in which a template matcher (101) receives each input set (104) during operation of the directory service. It searches the templates (100), and when a match is found, indicates the performance object selection to an optimized code path selector (102).

The optimized code path selector (102) then retrieves the stored optimized code path from the selected performance object (1060, 1070, 1080), passing this optimized code path to a code processor to execute upon the input set (104), thereby producing a result (105).

Figure 11:
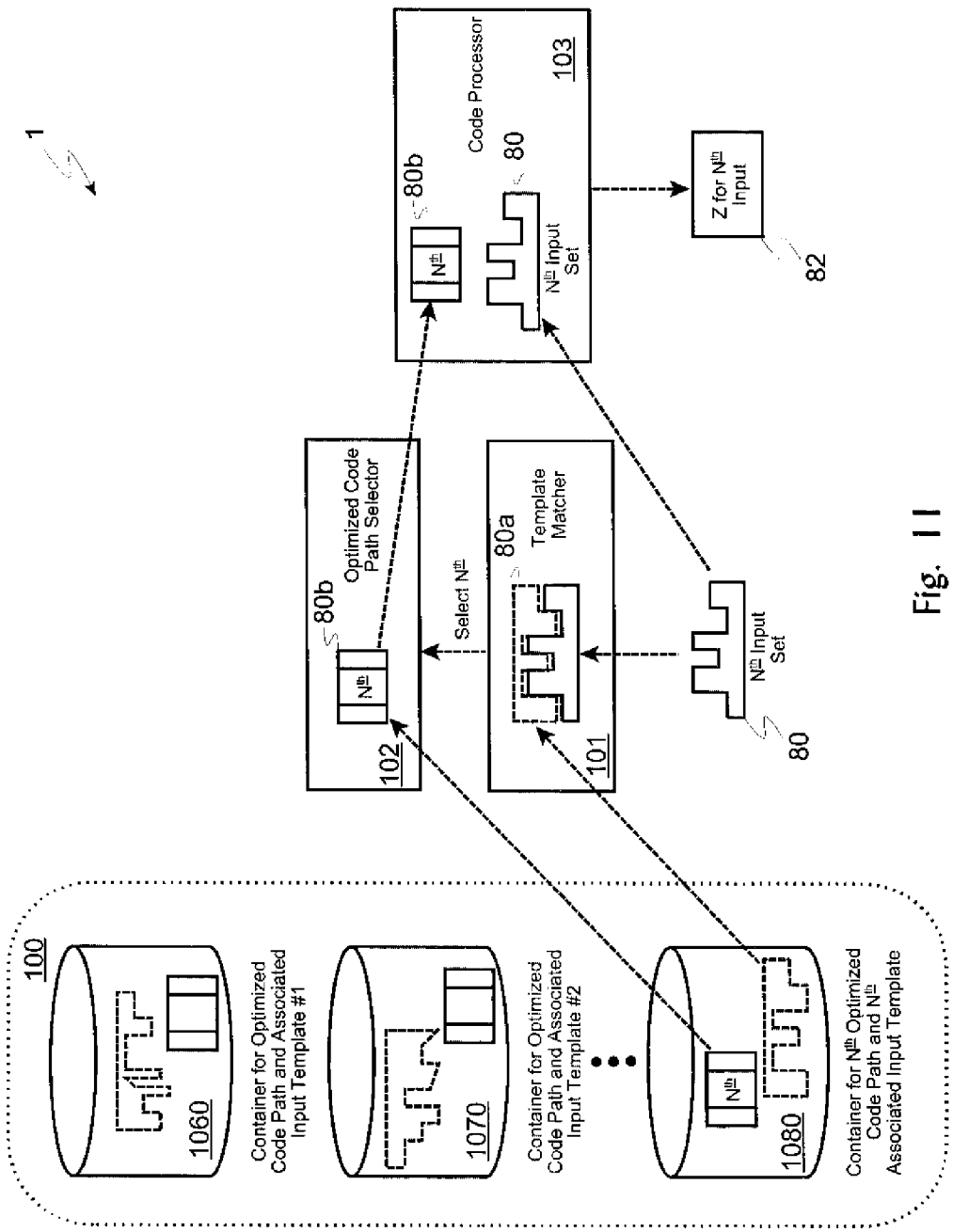
FIG. 11 shows a system for matching templates to input sets, selecting a stored, previously-optimized code path from a directory performance container, and executing the selected optimized code path on the recognized input set, for a hypothetical $N^{th}$ input set, according to the invention.
Figure 12:
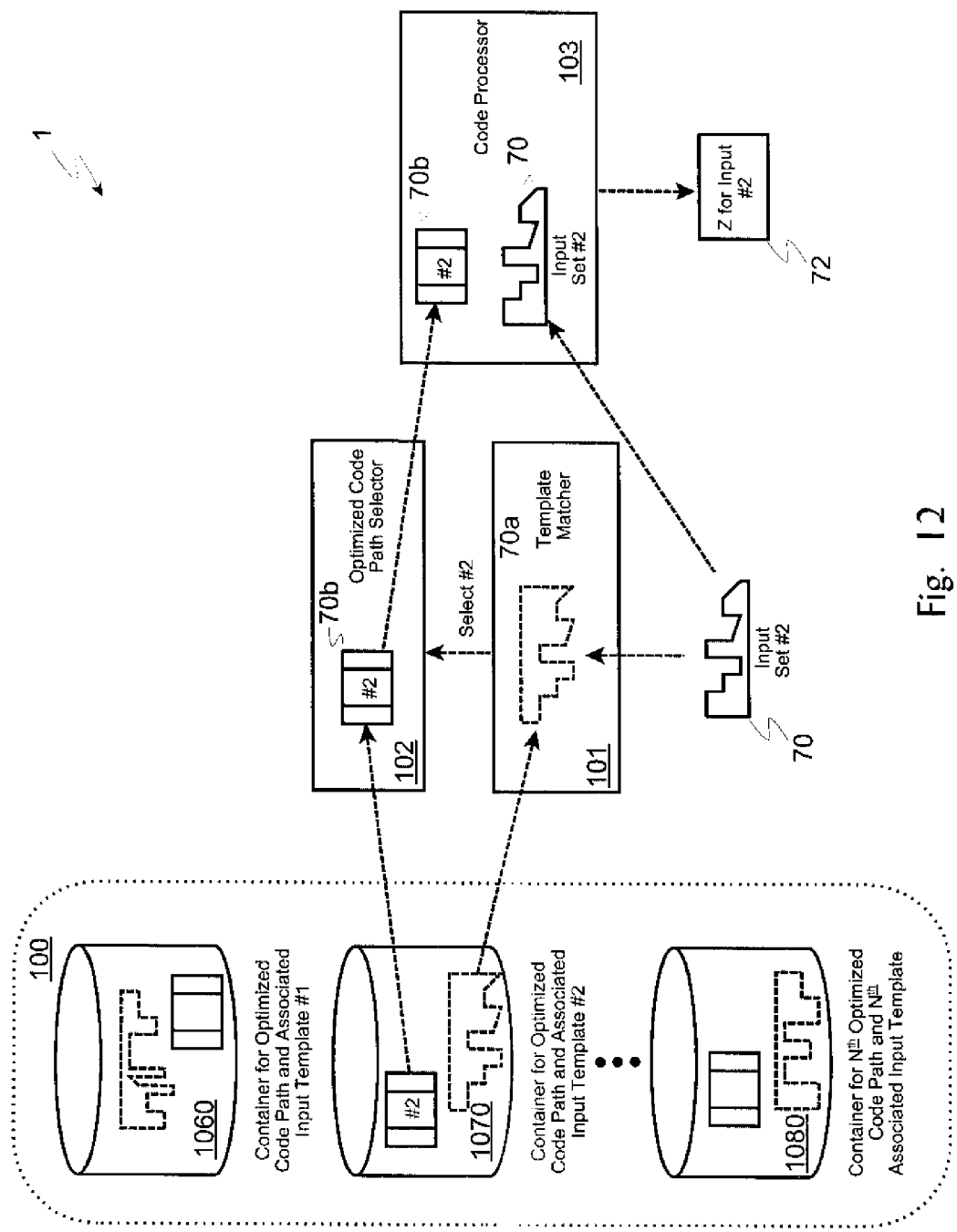
FIG. 12 shows the system of FIG. 11, but operating on a second input set, for illustrative purposes.

For example, as shown in FIG. 11, when an input set of the $N^{th}$ type (80) is recognized by the matcher (101) using the $N^{th}$ input template (80a) then the corresponding $N^{th}$ optimized code path (80b) is retrieved from the $N^{th}$ performance object (1080). Then, the processor (103) executes the $N^{th}$ optimized code path (80b) on the input (80) to produce the result (82).

Likewise, for input sets of type #2 (70), the second template (70a) is matched (101) against the input (70), resulting in the retrieval (102) of the second optimized code path (70b)

from the performance object (1070), and ultimately in the execution of the optimized code path (70*b*) on the input (70) to produce results (72).

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
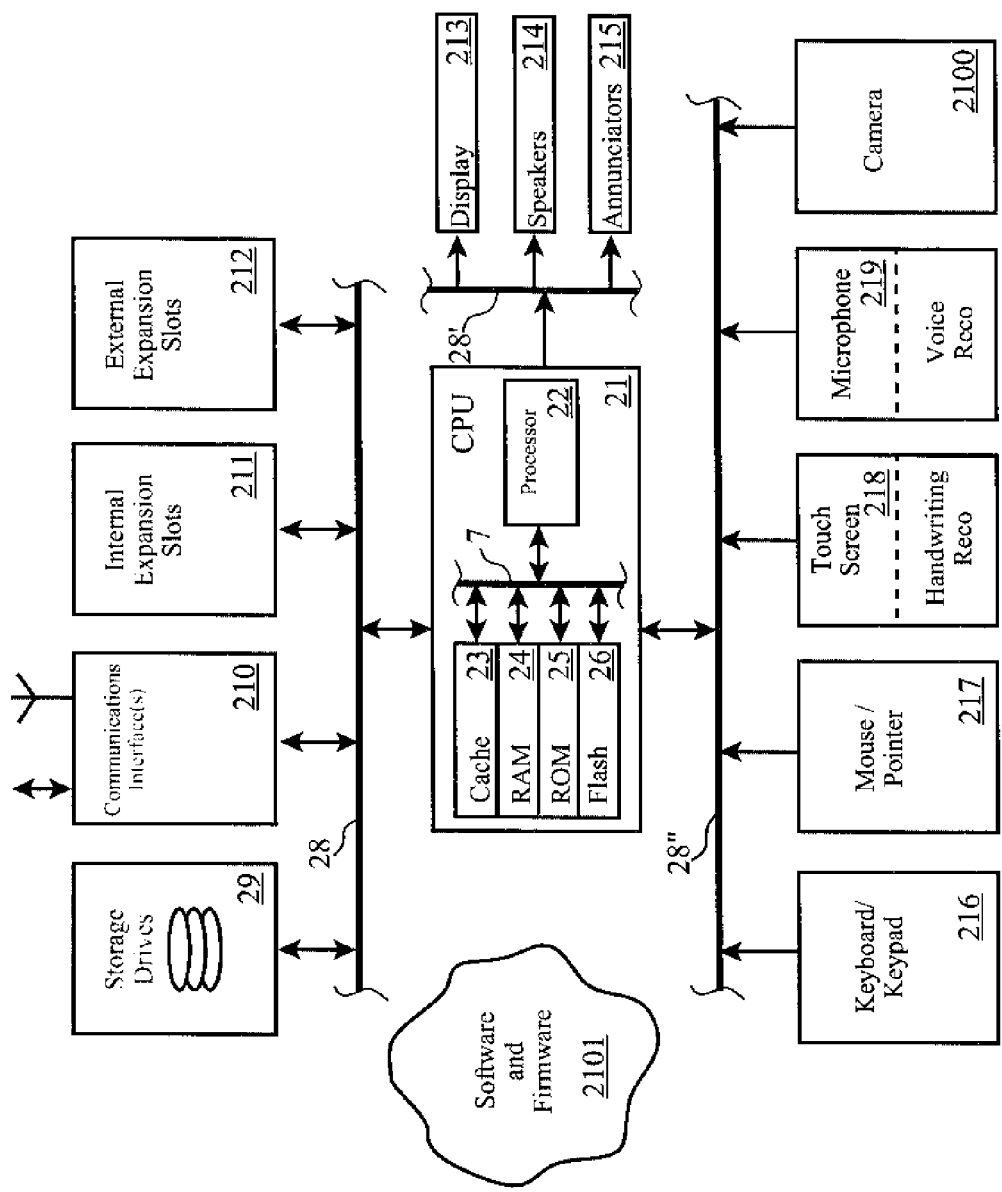
FIGS. 2a and 2b show a generalized computing platform architecture, and a generalized organization of software and firmware of such a computing platform architecture.

Turning to FIG. 2*a*, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
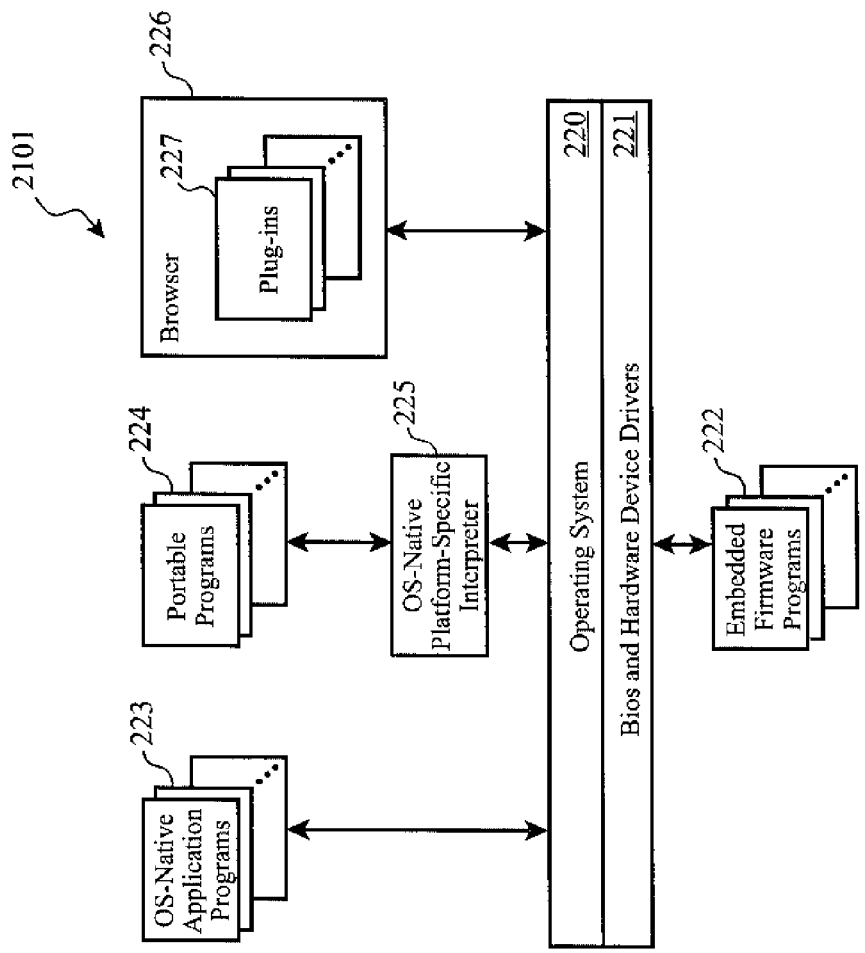

Turning to now FIG. 2*b*, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
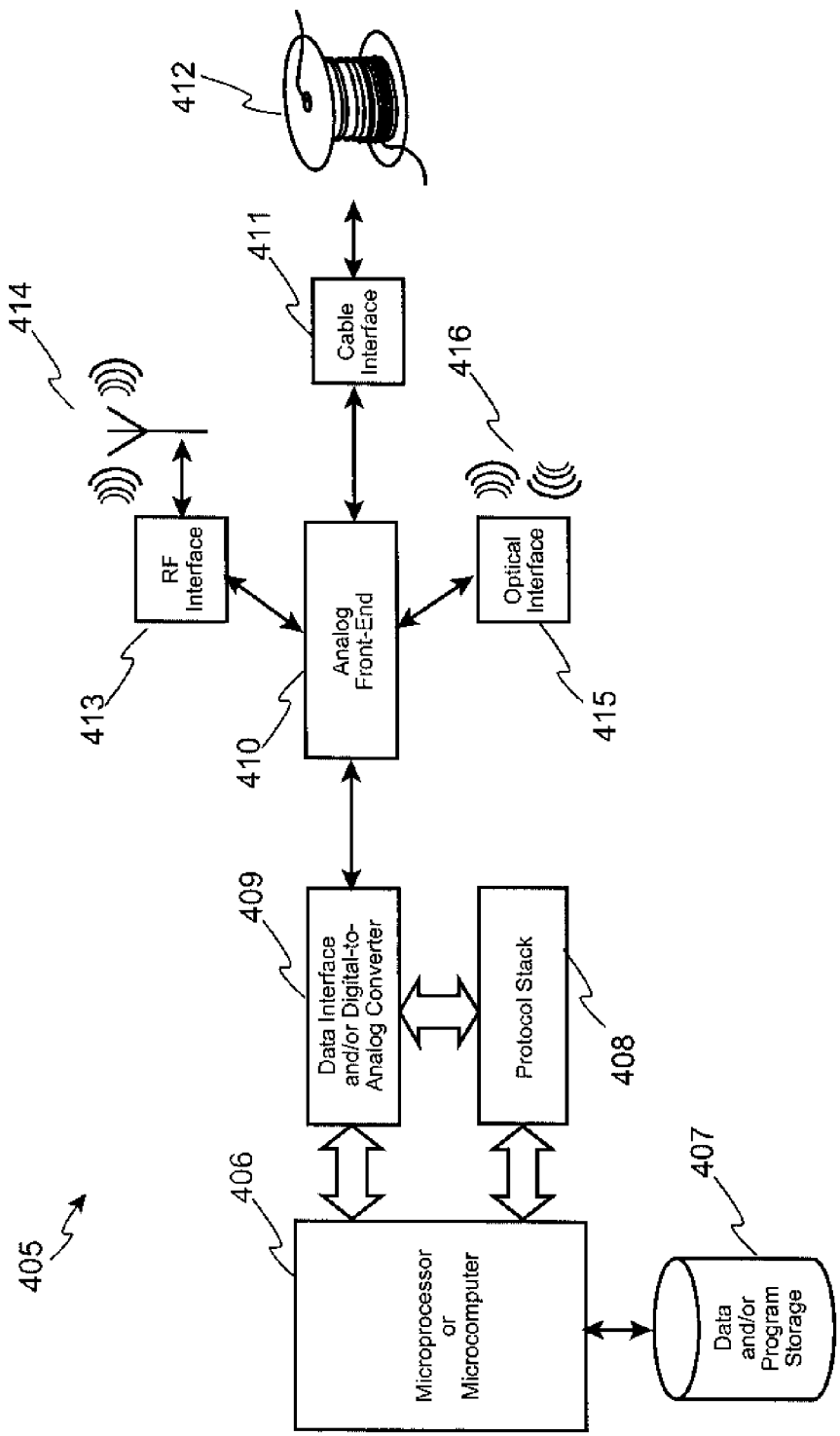

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter. Any such modulated signals (optical, electrical, electro-magnetic, etc.) encoded with software can be used to temporarily store and transport software from a source to a destination.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electro-magnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
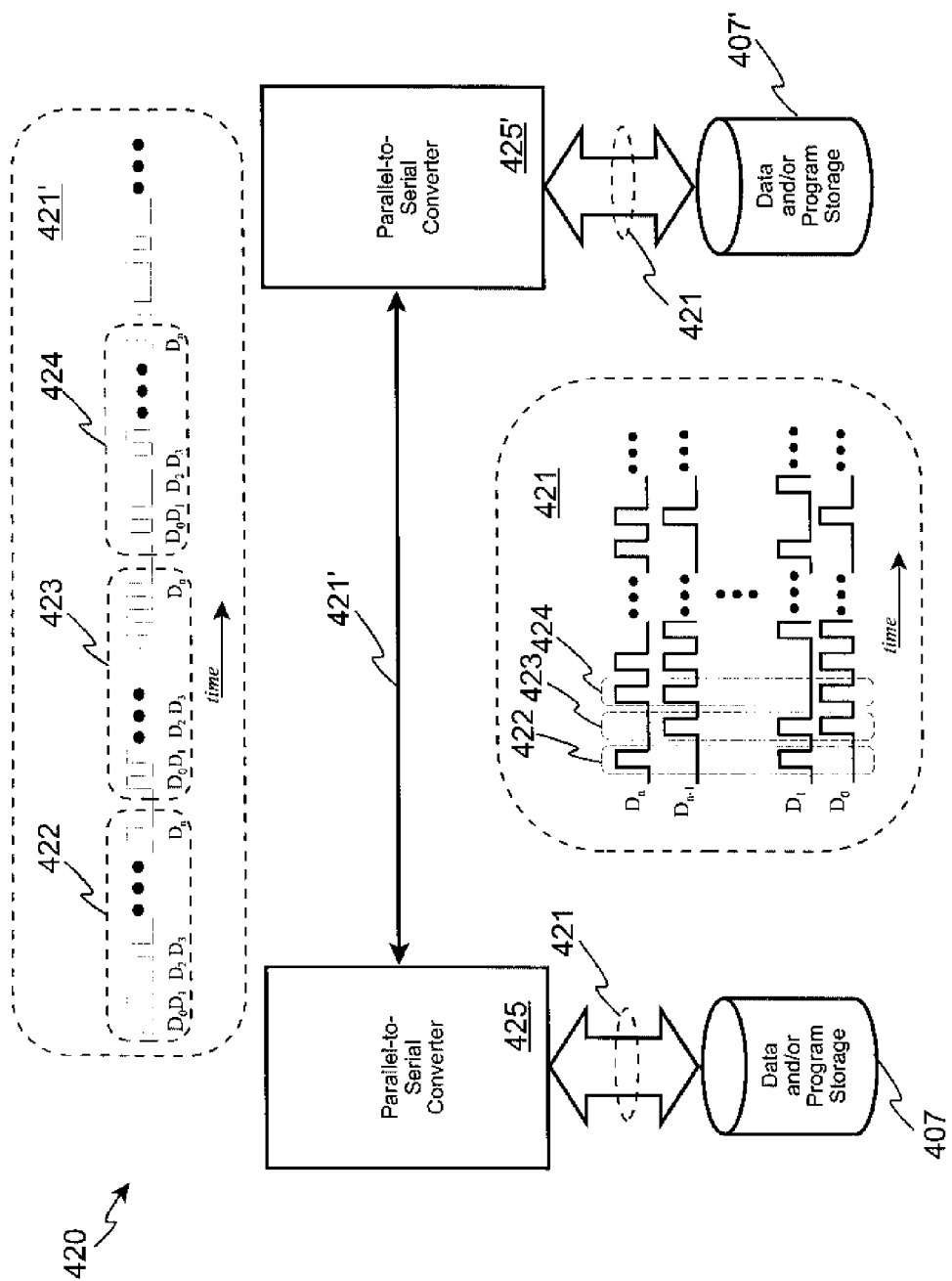

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

Service-Based Embodiments

Alternative embodiments of the present invention include some or all of the foregoing logical processes and functions of the invention being provided by configuring software, deploying software, downloading software, distributing software, or remotely serving clients in an on demand environment.

For example, one company (e.g. a "service provider") may provide a user or customer by downloading software programs to perform template generation, input set recognition, and selection of optimized code paths, where the downloaded software is persistent (e.g. remotely installed) or temporary (e.g. downloaded Java applets erased after completion of a session).

Software Deployment Embodiment. According to one embodiment of the invention, the methods and processes of the invention are distributed or deployed as a service by a service provider to a client's computing system(s).

Figure 3A:
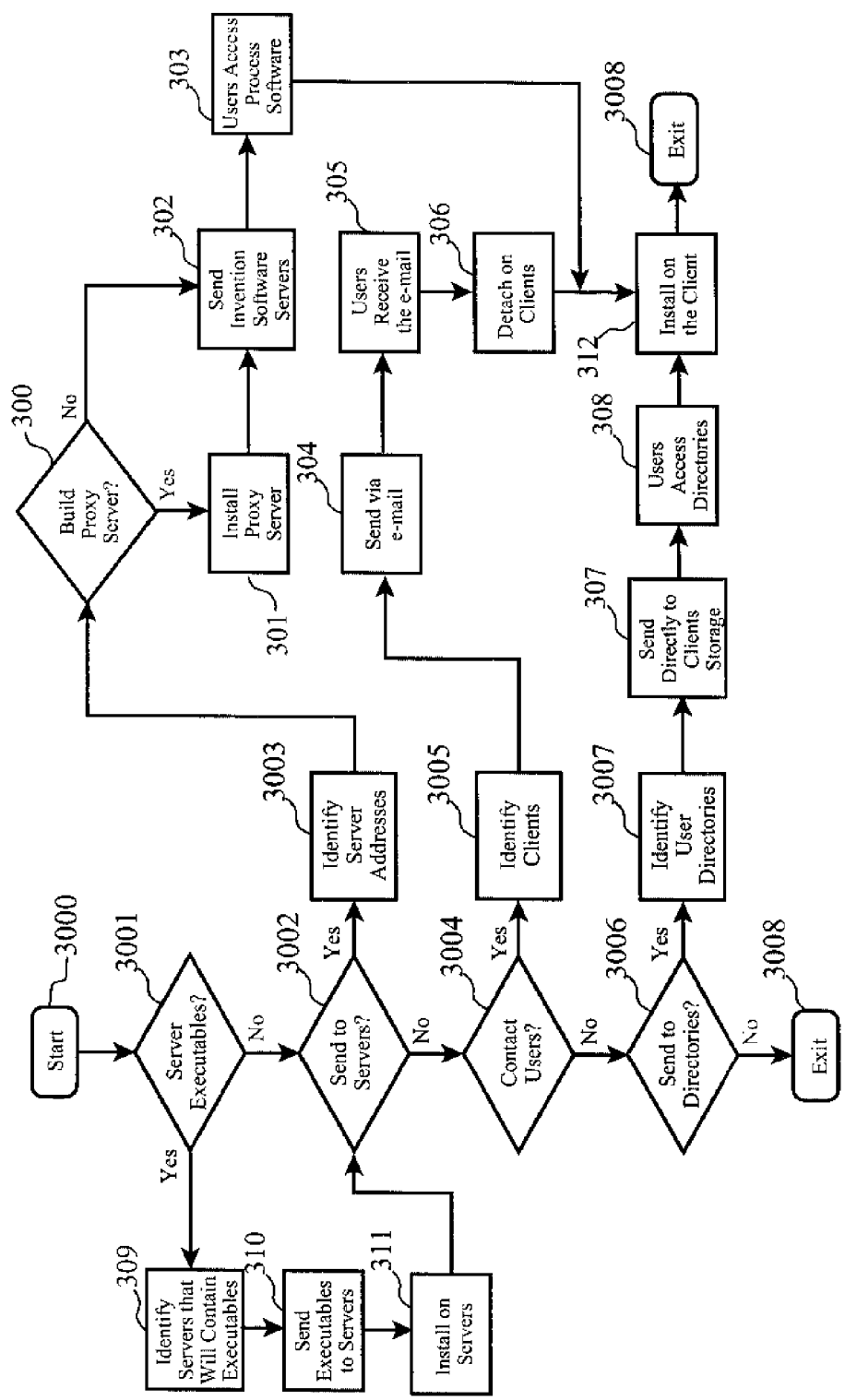
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
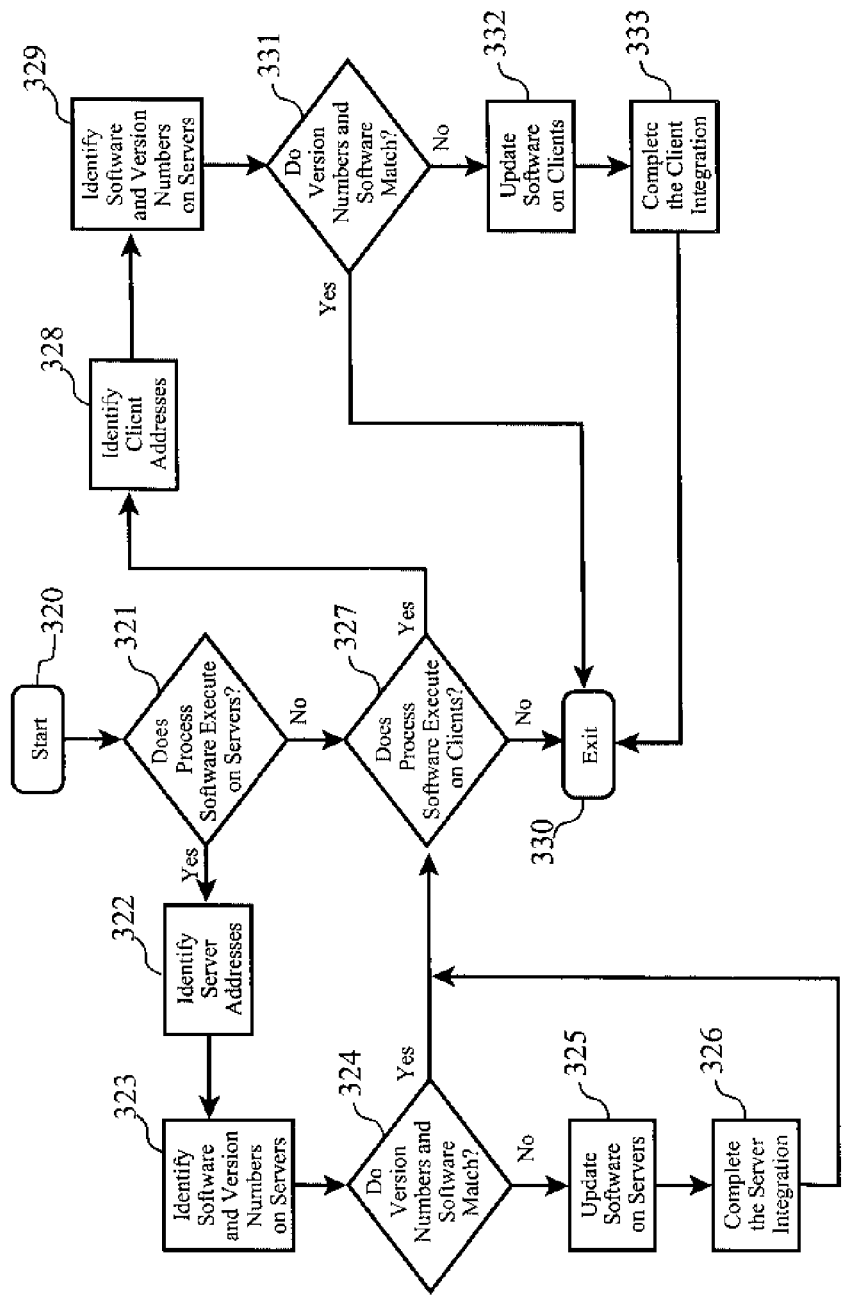
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
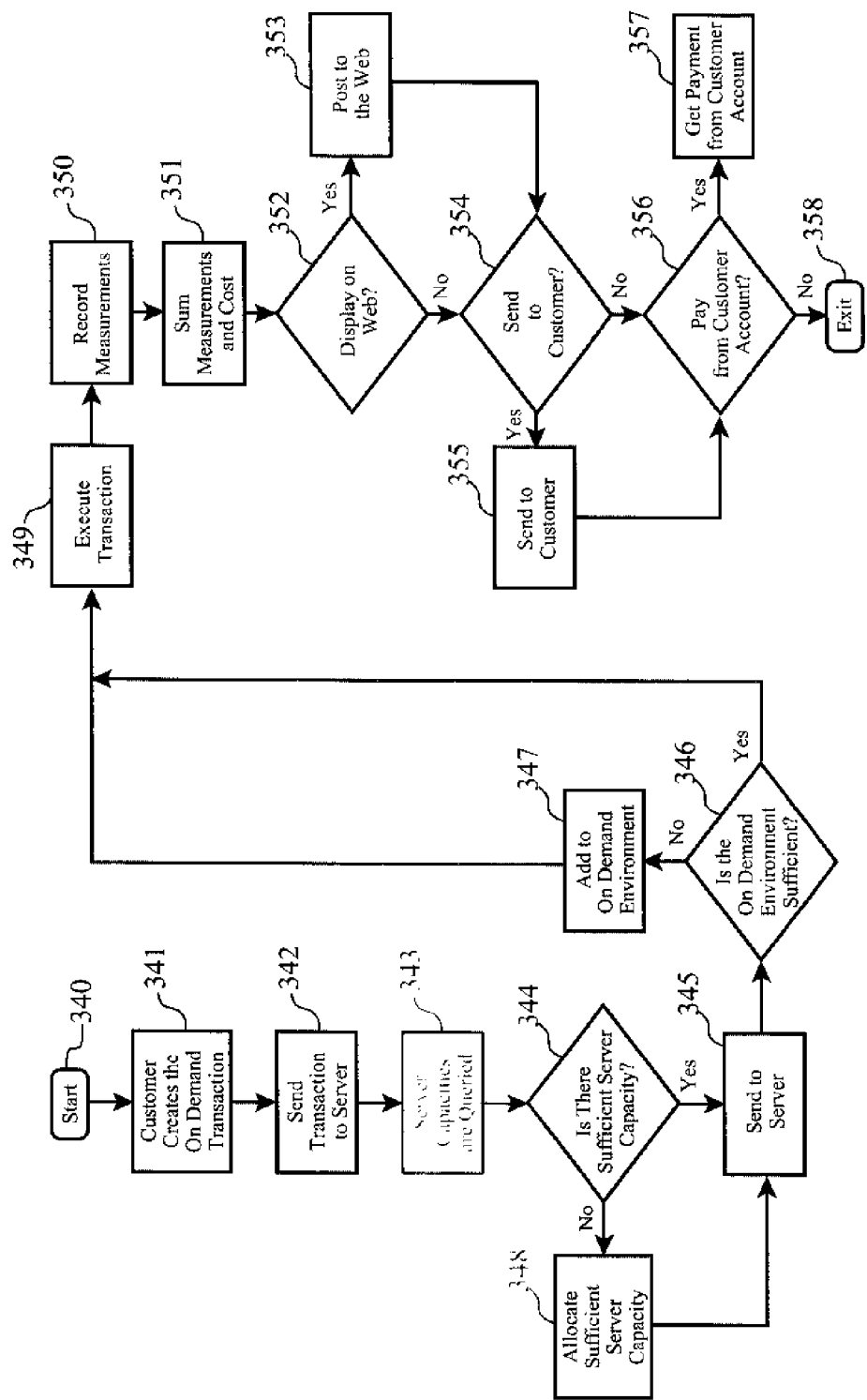
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process queries for data which are expected to consume significant resources, in order to expedite completion of response to the query, or both. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
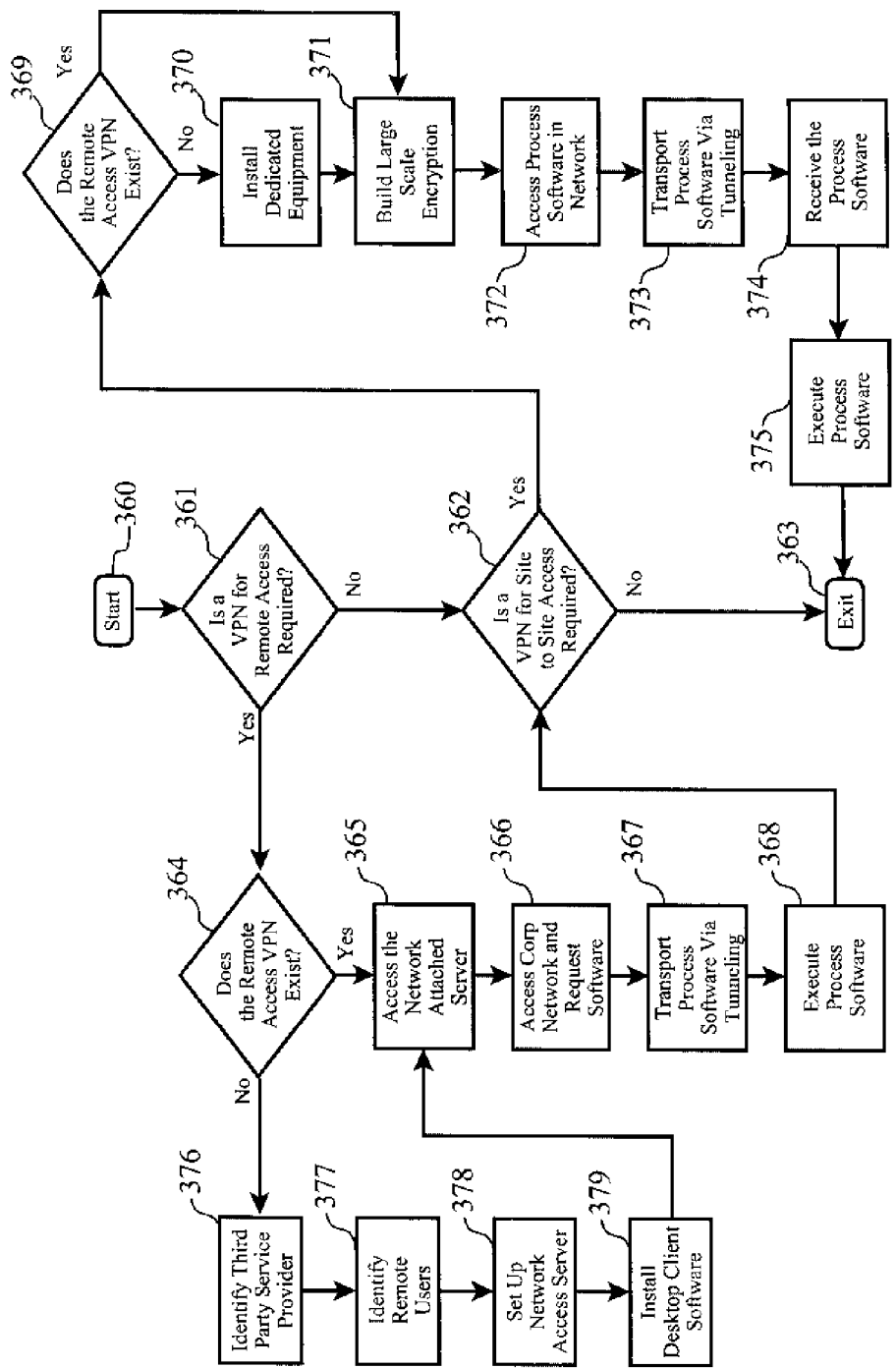
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

CONCLUSION

While certain examples and details of at least one preferred embodiment have been disclosed, it will be recognized by those skilled in the art that variations in implementation such as use of different programming methodologies, computing platforms, protocols and processing technologies, may be adopted without departing from the spirit and scope of the present invention. Therefore, the scope of the invention should be determined by the following claims.

What is claimed is:

1. An automated method for creation of performance objects for a directory server comprising:
accessing by a directory server an input template or rule base for one or more groups of similar input sets for identifying a newly-received input set for similarity to a group of previously-handled input sets;
receiving by a directory server a first executable code path program product having a first plurality of condition-ally-executed operations for a first range of input commands and queries using a plurality of conditionally-executed statements;
copying by a directory server the first executable code path program product into a second executable code path program product;
optimizing the second executable code path program product for at least one group of similar input sets by reduction of steps and operations within the second code path program product according to performance monitor data for a second range of input commands and queries which is smaller or less than the first range;
subsequent to creation of the at least second executable code path program product, intercepting by a directory server a newly-received input set destined to a directory server, and determining a match between the intercepted input set and one of the input templates; and
executing by a directory server the second code path program product according to the match.

2. The method as set forth in claim 1 further comprising:
receiving by a directory server a plurality of previously-handled input sets;
determining by a directory server similarities between groups of previously-handled input sets; and
creating by a directory server an input template or rule base for each group of previously-handled input sets suitable for identifying an input set which is similar to a group of previously-handled input sets.

3. The method as set forth in claim 2 wherein the previously-handled input sets comprise one or more lightweight directory access protocol input sets.

4. The method as set forth in claim 1 wherein the reduction comprises at least one step selected from the group consisting of elimination of unused steps, elimination of under-utilized steps, removal of ineffective conditional operations, and modification of low-rate-of-success accesses in the generalized code path.

5. The method as set forth in claim 1 wherein the second code path program product comprises a lightweight directory access protocol server program product disposed in a tangible computer-readable memory device.

6. The method as set forth in claim 1 further comprising storing an optimized code path program product and an associated input template in a performance object in a tangible computer-readable memory device.

7. The method as set forth in claim 6 wherein the storing in a performance object comprises alteration of a physical property of a tangible computer-readable memory device.

8. A system for creation of performance objects for a directory server comprising:
at least one identifying template associated with a group of similar input sets;
a code path generator portion of a directory server for:
receiving a first executable code path program product having a first plurality of conditionally-executed operations for a first range of input commands and queries using a plurality of conditionally-executed statements,
copying the first executable code path program product into a second executable code path program product; and
optimizing the second executable code path program product for at least one group of similar input sets by reduction of steps and operations within the second code path program product according to performance monitor data for a second range of input commands and queries which is smaller or less than the first range;

a portion of a computer readable memory device storing at least one performance object containing at least one input template for a group of similar input sets and a corresponding optimized second code path program product;

a template matcher portion of a directory server computer for, subsequent to creation of the at least second executable code path program product, intercepting a newly-received input set destined to a directory server, and for determining a match between the intercepted input set and one of the input templates; and a processor for executing the second code path program product according to the match.

9. The system as set forth in claim 1 wherein the processor is configured to alter a physical property selected from the group consisting of an optical property, a magnetic property, and an electronic property.

10. The system as set forth in claim 1 further comprising a template generator configured to receive a plurality of previously-handled input sets, to determine similarities between groups of the previously-processed input sets, and to create a new input template or rule base for each group suitable for identifying an input set which is similar to a group of previously-handled input sets.

11. The system as set forth in claim 10 wherein previously-handled input sets comprise one or more lightweight directory access protocol input sets.

12. The system as set forth in claim 10 wherein the optimizing comprises minimizing at least one performance factor selected from the group consisting of execution bandwidth, memory use, and resource consumption of the second code path program product.

13. The system as set forth in claim 12 wherein code path generator is further for performing an operation selected from the group consisting of reduction of unused steps, elimination of under-utilized steps, modification of ineffective conditional operations, and modification of low-rate-of-success accesses in the second code path program product.

14. The system as set forth in claim 1 wherein the optimized code path program product comprises a lightweight directory access protocol server program product disposed in a tangible computer memory device of said media.

15. The system as set forth in claim 1 wherein the optimized code path generator is further for associating corresponding optimized code path program products and input templates by storing in a plurality of performance objects, the performance objects being accessible by the matcher.

16. The system as set forth in claim 15 wherein the performance objects are disposed in a tangible computer memory device.

17. A computer program product for creation of performance objects for a directory server comprising:
a tangible computer-readable memory device;
one or more program codes disposed in the tangible, computer-readable memory device and configured to cause a processor to perform the steps of:
input sets for identifying a newly-received input set for similarity to a group of previously-handled input sets;
receiving a first executable code path program product having a first plurality of conditionally-executed operations for a first range of input commands and queries using a plurality of conditionally-executed statements;
copying the first executable code path program product into a second executable code path program product;
optimizing the second executable code path program product for at least one group of similar input sets by reduction of steps and operations within the second code path program product according to performance monitor data for a second range of input commands and queries which is smaller or less than the first range;
subsequent to creation of the at least second executable code path program product, intercepting a newly-received input set destined to a directory server, and determining a match between the intercepted input set and one of the input templates; and
executing the second code path program product according to the match.

18. The computer program product as set forth in claim 17 wherein the intercepted input set comprises a lightweight directory access protocol input set.

19. The computer program product as set forth in claim 17 wherein the computer-readable memory device comprises a persistent storage device.

\* \* \* \* \*